(12) United States Patent
Watanabe

(10) Patent No.: US 7,085,061 B2
(45) Date of Patent: Aug. 1, 2006

(54) SHEET SHAPED OPTICAL ELEMENT PACKAGE, A METHOD OF USE OF SHEET SHAPED OPTICAL ELEMENTS, A METHOD OF MANUFACTURING A SHEET SHAPED OPTICAL ELEMENT PACKAGE, AND A DEVICE FOR MANUFACTURING A SHEET SHAPED OPTICAL ELEMENT PACKAGE

(75) Inventor: Masanari Watanabe, Kanagawa-Pref. (JP)

(73) Assignee: 3M Innovative Properties Company, St. Paul, MN (US)

( * ) Notice: Subject to any disclaimer, the term of this patent is extended or adjusted under 35 U.S.C. 154(b) by 90 days.

(21) Appl. No.: 10/693,918

(22) Filed: Oct. 28, 2003

(65) Prior Publication Data

US 2004/0257659 A1 Dec. 23, 2004

(30) Foreign Application Priority Data

Dec. 2, 2002 (JP) ........................ 2002-349459

(51) Int. Cl.
*G02B 27/10* (2006.01)

(52) U.S. Cl. ........................ 359/619; 359/628
(58) Field of Classification Search ................ 359/599, 359/619, 628; 349/62, 64, 65, 112, 73, 74; 362/31, 335

See application file for complete search history.

(56) References Cited

U.S. PATENT DOCUMENTS

| 4,400,252 | A | * | 8/1983 | Ushijima | .................... 204/478 |
| 5,234,105 | A | | 8/1993 | Sato et al. | |
| 5,394,255 | A | | 2/1995 | Yokota et al. | |
| 5,552,907 | A | | 9/1996 | Yokota et al. | |
| 5,764,315 | A | | 6/1998 | Yokota et al. | |

FOREIGN PATENT DOCUMENTS

| JP | 5-203950 | 8/1993 |
| JP | 3048826 | 3/1998 |
| JP | 11-79235 | 3/1999 |
| JP | 2000-180613 | 6/2000 |
| JP | 2001-287868 | 10/2001 |
| JP | 2002-82388 | 3/2002 |
| JP | 2002-86461 | 3/2002 |

* cited by examiner

*Primary Examiner*—Ricky L. Mack
(74) *Attorney, Agent, or Firm*—Stephen W. Buckingham

(57) ABSTRACT

A sheet shaped optical element package including a base film, plural sheet shaped optical elements on the base film, and a cover film formed on the plural sheet shaped optical elements, the plural sheet shaped optical elements being arranged on the base film in a row, each of the sheet shaped optical elements having the optical direction, the above surface of the plural sheet shaped optical elements being covered by the cover film in a manner such that the cover film covers the sheet shaped optical elements having a blank part on it.

12 Claims, 14 Drawing Sheets

SHEET SHAPED OPTICAL ELEMENTS PACKAGE OF EXAMPLE 1 (SECTION)

EMBODIMENT OF SUPPLYING FORM
OF THE PACKAGE OF EXAMPLE 1
(SINGLE REEL FORM AND Z-SHAPED
FOLDING FORM)

EMBODIMENT OF USING THE PACKAGE, OF EXAMPLE 1 (COVER FILMS ARE REMOVED BY THE REMOVER ROLLERS AND ROLLED BY THE UPPER AND LOWER ROLLERS)

CONSTRUCTION OF PACKAGING OF THE SHEET SHAPED OPTICAL ELEMENTS IN EXAMPLE 2

ROUGH ILLUSTRATION OF SMALL SIZE BACK LIGHT SYSTEM (FOR A LIQUID CRYSTAL DISPLAY OF MOBILE PHONE OR DIGTAL CAMERA)

- 1a PRISM SHEET (LATITUDINAL)
- 1b PRISM SHEET (LONGITUDINAL)
- 7 DIFFUSION SHEET
- 6 LIGHT GUIDE
- 5 REFLECTOR SHEET

LIGHT SOURCE 4

PRIOR PACKAGE CONSTRUCTION (PLANE)

1 LENS FILM
(SHEET SHAPED OPTICAL ELEMENT)

2 BASE FILM

PRIOR ART OF PACKAGE (SECTION)

SHEET SHAPED OPTICAL PACKAGE OF EXAMPLE 4

FIG.12 CONSTRUCTION OF PACKAGING OF EXAMPLE 4

EMBODIMENT OF THE DEVICE OF EXAMPLE 4

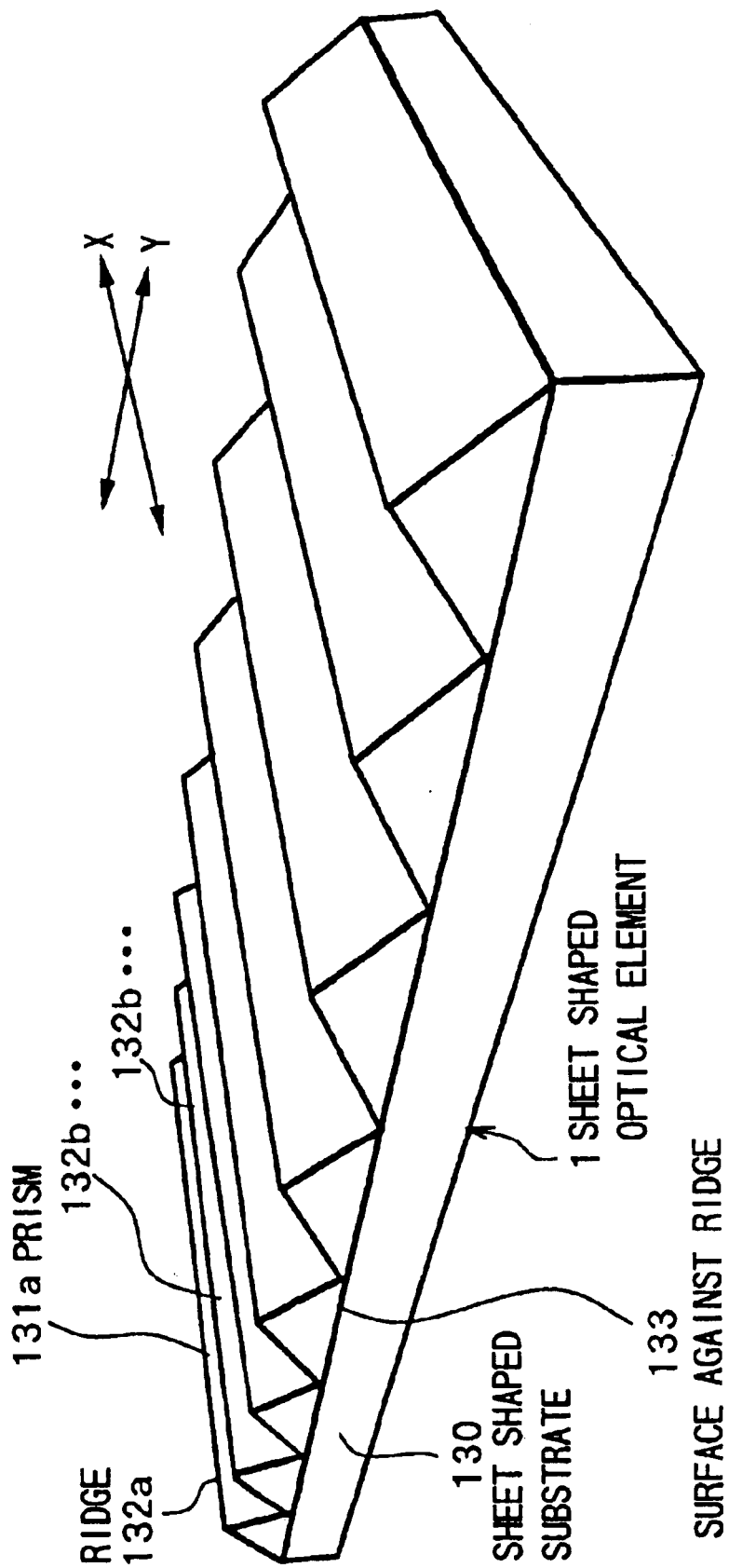
FIG.14 ILLUSTRATION OF SHEET SHAPE OPTICAL ELEMENT

SHEET SHAPED OPTICAL ELEMENT PACKAGE, A METHOD OF USE OF SHEET SHAPED OPTICAL ELEMENTS, A METHOD OF MANUFACTURING A SHEET SHAPED OPTICAL ELEMENT PACKAGE, AND A DEVICE FOR MANUFACTURING A SHEET SHAPED OPTICAL ELEMENT PACKAGE

BACKGROUND OF THE INVENTION

1. Field of the Invention

The present invention relates to a sheet shaped optical element package, a method of use of sheet shaped optical elements, a method of manufacturing a sheet shaped optical element package, and a device for manufacturing a sheet shaped optical element package. The sheet shaped optical element package of the present invention is a package structure in which sheet shaped optical elements are supported by a base or a protection film or the like. The sheet shaped optical element package can be delivered in the form of such a package structure.

2. Description of the Prior Art

Optical elements constructed in the shape of a sheet, which have been used for various purposes, are known. For instance, a lens known as a fresnel lens is made in the shape of a film. Also, a so called prism sheet, that is, a prism made in the shape of a sheet, is known. Also a micro lens in a shape of a sheet is known.

In the prior art, sheet shaped optical elements are used, for example, as a display of a mobile phone, and as a display of a digital camera FIG. 8 shows a schematic view of the construction of a lightning system called back light system As shown in the figure, the light from a light source 4 is reflected by a reflector sheet 5 located in the back position, and goes through a light guide 6, which can introduce the light. After that, the light is diffused by a diffuser 7, and goes through a back side prism sheet (longitudinal) 1b and a surface side prism sheet (latitudinal) 1a, and finally illuminates a liquid crystal display. In the instance shown by the figure, two sheet shaped prisms are used as optical elements; one is positioned on the surface side and the other is positioned on the back side. The reason for using such two sheet shaped prisms is described below. As each of the sheet shaped prisms has a directional function, the brightness of the light introduced through each prism is enhanced in the different directions. Therefore, by the use of the two sheet shaped prisms, the illumination efficiency is advanced. For example, Japanese patent application laid open publication No. Heisei 5-203950 (203950/1993) discloses the structure described below. The structure has plural sheets, and one side of each of the plural sheets has many prisms, each of which is triangular in sectional view. On each of the plural sheets, the edges (ridges) of the triangles are arranged in a parallel series. In the structure, the plural sheets are piled in such a manner that the edges (ridges) of the triangles form an angle of 5-~85—with each other. By the use of such structure, the prism system clearly illuminates the LED.

Especially, in the structure in which the light source is positioned at the edge of the display as shown in FIG. 8, the construction of the sheet shaped optical element is of prime importance, in order to introduce the light to the center of the display, or to introduce the light to the surface of the display equally. The light source cannot always be located at a suitable position to obtain the desired illumination on the display. The form of the light source can be varied, for example, a point source or a line source. Therefore, it is necessary to introduce the light suitably by the sheet shaped optical element, in order to give the proper light distribution on the display.

The aforesaid prior construction shown in FIG. 8 is an example of a back light system, in which a light source is located on the back side of the display to be illuminated. Another prior construction has been used also, as front light system in which a light source is located on the front side of the display. In the front type construction, a light source 4 is located on the surface side of the display.

The above mentioned layer system is one example of the structures of the sheet shaped optical elements. Other structures can be applied. For example, the structure can comprise only three elements; that is, one is a prism sheet, which is preferably rich in light direction effects and in light collecting effects, another one is a light guide, and the other one is a reflector. A structure comprising only two sheets of prisms and a reflector can be used. Any other structure can be used. According to the necessity, the manner of assembling the sheet shaped optical elements, and how to use them can be determined variously by the users.

When such sheet shaped optical elements are conveyed to users, or they are transferred for processing, the sheet shaped optical elements are, in general, packaged and supported by guard materials. The sheet shaped optical elements have recently become thinner and smaller in size. Therefore, the package structure is of great importance now. It is also desired to package the sheet shaped optical elements so as to treat them easily when they are processed after being transferred, especially when they are picked up to be processed. In addition, as described above, the manner of constructing sheet shaped optical elements and what systems use them are varied. Namely, various forms are required in accordance with various demands.

The kind of sheet shaped optical element package as above mentioned, the construction of which is shown in FIG. 9 (plan view) and FIG. 10 (section view), has been generally accepted. This construction consists of small sheet shaped optical elements 1, for example, lens films which are lenses each made in the shape of a sheet, or a prism sheet which is a sheet shaped optical element with prism ability, each optical element being covered by a cover film 31 of equal size. The reason why the equally sized cover film is used is because the optical element 1 and the cover film 31 are cut at the same time when they are obtained. The base film 2 serves to support the sheet of the optical element 1 with the cover film 31. At the same time, the base film serves as a protection sheet.

In the prior art, the above mentioned sheet shaped optical element package is formed in a shape corresponding to the shape of the display surface as shown in the figure, for example rectangular, as in FIG. 9. Each sheet shaped optical element is slantingly arranged on the base film 2 as shown in FIG. 9. In other words, a side of each sheet shaped optical element, for example a longer side of each sheet shaped optical element, forms a certain angle with the longer side of the base film 2. The reason is that the specifications of the machines of the users are different from each other. For instance, an angle of 5°, or an angle of 13° may be employed. (Refer to Japanese patent application laid open publication No. Heisei 5-203950 (203950/1993) mentioned above).

The reason why the optical element 1 has the oblique position mentioned above, is as follows. It is necessary to give the certain specific direction of refraction to the light from the light source, like the back light. When the light illuminates the display such as a liquid crystal display of a mobile phone, it sometimes occurs that a striped vision appears on the display. This phenomenon is caused by "Moire which is an inequality of the brightness on the surface of the display. The inequality of the brightness occurs by the interference generated when the refracted light, introduced in its direction determined by the sheet shaped optical element 1, goes through the picture elements (dots) of the liquid crystal cell. The degree of the interference is determined by the size of the picture elements (dots) of the liquid crystal cell, and the angle of incidence for the refracted light. Therefore, the oir can disappear through the control of either the size or the angle. Generally speaking, as the size of the picture elements (dots) of the liquid crystal cell is determined by the resolution of the display, it is considered necessary to give a certain angle to the sheet shaped optical element, such as a prism sheet, in order to prevent the appearance of the oir pattern. In this case, the angle must be given differently according to the size of the picture elements of the liquid crystal cell. As mentioned above, since it is desired to illuminate the surface of the display equally, in order to reduce the oir pattern to a minimum, the sheet shaped optical element 1, such as a prism sheet, must be given a certain angle in the prior art.

The sheet shaped optical element is generally produced by cutting off a sheet, or stamping out a sheet from a wide sheet of the material. The material sheet is usually designed that it refracts the light perpendicularly. Therefore, by giving a certain angle to the sheet of the material when it is cut, it is possible to provide the optical direction to the sheet shaped optical element 1. In the prior art, each sheet shaped optical elements 1 is put on the base film as it is, namely, it makes an angle with the base film. Consequently, they are arranged slantingly as shown FIG. 9.

The prior known art described above have difficulties as explained below.

1) They are not suitable for automation, because the products are delivered in a sheet state in which sheet shaped optical elements are arranged in length and breadth.

2) As the size of the cover film 31 is equal to that of the sheet shaped optical element, it is not easy to separate them from each other.

3) When they are used in a liquid crystal display system as mentioned above, as a nature of the products, namely in order to prevent the interference with the liquid crystal display, a certain angle must be given between the four sides of the base film 4 and the four sides of the sheet shaped optical element. The angle is, for example, 5° or 13°, but the value of the angle can be varied according to the desired specification of the products. Consequently, the direction of the base film 4 is different from that of the sheet shaped optical element. As a result, it is difficult to treat the products. It is also difficult to pick up the sheet shaped optical elements in order to process them.

4) As the sheet shaped optical elements are arranged in length and breadth, a rather wide space is necessary to keep and stock them. Recently, manufacturing lines have changed from conveyer systems to cell (one person) systems. Therefore, such necessity for large storage space causes much inconvenience.

SUMMARY OF THE INVENTION

It is an object of the present invention to provide a sheet shaped optical element package, a method of use of sheet shaped optical elements, a method of manufacturing a sheet shaped optical element package, and a device for manufacturing a sheet shaped optical element package, which conquer the aforementioned difficulties of the prior art. Namely, it is an object of the present invention to provide a sheet shaped optical element package and so on, which are easy to treat, convenient to deliver and supply, easy to treat the sheet shaped optical element for pick up, easy to process and manufacture, and can accept an automated lines, and have an advantage concerning storage space.

In the present invention, the object is realized as follows.

The first type of the sheet shaped optical element concerning the present invention is as follows, and this performs the above object of the present invention:

A sheet shaped optical element package comprising:

a base film, plural sheet shaped optical elements carried on the base film, and a cover film formed on the plural sheet shaped optical elements;

wherein:

the plural sheet shaped optical elements are arranged on the base film in a row;

each of the sheet shaped optical elements have an optical direction; and the above surface of the plural sheet shaped optical elements are covered by the cover film in a manner such that the cover film covers the sheet shaped optical elements having a blank part on it.

In this specification, the word aving an optical direction means collecting light and the direction of the collection of the light is a certain specific one.

According to the invention concerning the first type of the sheet shaped optical element, as the plural sheet shaped optical elements are arranged on the base film in a row (i.e. in one row), it is convenient to treat them. As each of the sheet shaped optical elements has the optical direction, namely it has its specific optical direction, illumination with desired distribution of brightness can be obtained. For example, it is easy to perform illumination equally to all of the surfaces of the liquid crystal display by satisfactory brightness. Also desired field of view can be obtained. As the cover film covers the sheet shaped optical elements with a blank part (margin) on it, it is easy to discover the cover film and take the sheet shaped optical elements out. As a result, it is easy to treat the sheet shaped optical elements. It is convenient to supply and use the sheet shaped optical elements to manufacture or to assemble. As a result, an effective machine results to which the sheet shaped optical elements are applied. It is advantageous from the viewpoint of space as they are arranged in a row.

The second type of the sheet shaped optical element package concerning the present invention is as follows, and this performs the above object of the present invention:

A sheet shaped optical element package comprising:

a base film, and plural sheet shaped optical elements carried on the base film;

wherein:

the plural sheet shaped optical elements are arranged on the base film in a row;

each of the sheet shaped optical elements has plural prisms having a sectional view which is a triangle;

the ridge corresponding to an apex of the triangle of each prism faces an opposite side to a sheet shaped substrate;

the surface of the prism against the ridge is combined with the sheet shaped substrate as one body;

the ridge of each prism runs parallel with each other;

each sheet shaped optical element is supported by being carried by the base film; and the surface of each sheet shaped optical element on which the plural prisms are formed is positioned on the opposite side to the base film.

According to the invention concerning the second type of the sheet shaped optical element, it is possible to concentrate the light into the ridge (edge) of the prisms mentioned above. Therefore, in the direction that forms a right angle with the ridge (edge) of the prisms, there occurs a change of the luminance distribution caused by the concentration of light. But as to the direction along the ridge (edge) of the prisms, since no, or only a little, light condensing can occur, the affect to the luminance distribution is small. According to this invention, a different behavior of the concentration of light is experienced according to difference of the direction. By this, according to this invention, light having desired brightness distribution can be obtained. For instance, it is easy to obtain the satisfactory and equal brightness of the light throughout the whole surface of the liquid crystal display. Also it is possible to get a particular field of view. In addition, in this invention, as the plural sheet shaped optical elements are arranged on the base film in a row (in one row), it is easy to treat them. As a result of the facility, it is convenient to supply and use the sheet shaped optical elements to manufacture or to assemble. Therefore, an effective machine results to which the sheet shaped optical elements are applied. It is advantageous from the viewpoint of space as they are arranged in a row.

The above mentioned sheet shaped optical elements can be applied as the optical elements having the specific optical direction used in the first type of the sheet shaped optical element package described above. Namely, the above mentioned sheet shaped optical elements used in this invention, that is, the sheet shaped optical elements having plural prisms whose sectional view is a triangle, the ridge corresponding to an apex of the triangle of each prism faces the opposite side to a sheet shaped substrate, the surface of the prism against the ridge is combined with the sheet shaped substrate as one body, and the ridge of each prism runs parallel with each other, can be used as the optical elements having the specific optical direction used in the first type of the sheet shaped optical element package described above.

The third type of the sheet shaped optical element package concerning the present invention is as follows, and this performs the above object of the present invention:

A sheet shaped optical element package comprising:

a base film, plural sheet shaped optical elements carried on the base film, and a cover film formed on the plural sheet shaped optical elements;

wherein:

the plural sheet shaped optical elements are arranged on the base film in a row;

the base film being tape shaped carries the sheet shaped optical elements having a blank part on it;

each of the sheet shaped optical elements have an optical direction;

the above surface of the plural sheet shaped optical elements are covered by the cover film in a manner such that the cover film covers the sheet shaped optical elements having a blank part on it; and the cover film and the base film hold the plural sheet shaped optical elements between them.

According to the invention concerning the third type of the sheet shaped optical element, as the plural sheet shaped optical elements are arranged on the base film in a row (i.e. in one row), it is convenient to treat them. As each of the sheet shaped optical elements has the optical direction, namely it has its specific optical direction, illumination with desired distribution of brightness can be obtained. For example, it is easy to equally illuminate all surface of the liquid crystal display by satisfactory brightness. Also, a desired field of view can be obtained. As the cover film covers the sheet shaped optical elements with a blank part (margin) on it, it is easy to discover the cover film and take the sheet shaped optical elements out.

Also, since the cover film and the base film hold the plural sheet shaped optical elements between them, protection effect is stable and adequate.

Therefore, it is easy to treat the sheet shaped optical elements. It is convenient to supply and use the sheet shaped optical elements to manufacture or to assemble. As a result, an effective machine results to the sheet shaped optical elements are applied. It is advantageous from the viewpoint of space as they are arranged in a row.

In the first, second and third types of the sheet shaped optical element package concerning the present invention, the base film can be equal in size to the cover film, and the base film and the cover film can hold the plural sheet shaped optical elements between them in a sandwich structure.

In the first, second and third types of the sheet shaped optical element package concerning the present invention, each of the sheet shaped optical elements has an optical direction, that is, has light concentration effect into a specific direction. This results in the following effects.

The sheet shaped optical element plays a role to control the light, for example light from the source, and provides the illumination to the display by the desired brightness distribution, generally, brightness distribution that equally illuminates all of the surfaces of the display. In some cases, it provides the brightness distribution that produces local illumination, or different brightness between a character part and a graphic part. By the nature of the optical direction that collects the light to the specific direction, such an equal all surface illumination or local illumination to the particular part locally can be easily performed. Also, a desired angle of the scope of the field of view can be easily and conveniently realized. For instance, in the mobile phone, as the display of it is seldom seen from a slanted position unlike the display of television set, the angle of the scope of the field of view is not necessarily so wide. However, for example, the display of the small size game console may be seen by many persons from side positions. In such an instance, the angle of the scope of the field of view is desired to be wide. Also, the display commonly seen from the vertical position, for example, the display usually seen from the upper position such as the data display located below which must be seen from the upper driver position of the vehicle of the railway, the angle of the scope of the vertical field of view is desired to be wide.

Concerning the angle of the scope of the field of view, there are also various demands as described above. These demands can be accomplished by controlling the distribution of the brightness to provide a requested illumination. In such a case, it is very effective to provide the collecting effect that introduce the light to the specific direction. Especially, the aforementioned sheet shaped optical element used in the second type of the sheet shaped optical element package, is effective for controlling the distribution of the brightness. That is, the sheet shaped optical element having plural prisms whose sectional view is a triangle, the ridge corresponding to an apex of the triangle of each prism faces the opposite side to a sheet shaped substrate, the surface of the prism against the ridge is combined with the sheet shaped substrate as one body, and the ridge of each prism runs parallel with each other, is effective for controlling the distribution of the brightness. By various designs, various optical directions can be obtained. Therefore, a desired distribution of the brightness can be easily achieved. The instance constructed such that two sheets of sheet shaped optical element are used, refer to the explanation described about present example 2 and after that, is preferable. But the sheet shaped optical element with a large light collecting effect can be satisfactorily used without requiring the use of two sheets, and can provide the desired distribution of the brightness.

The fourth type of the sheet shaped optical element package concerning the present invention is as follows, and by this, the above object of the present invention is performed:

A sheet shaped optical element package comprising:

a base film, plural sheet shaped optical elements carried on the base film, and a cover film supplied on the plural sheet shaped optical elements; and an upper roller to roll up the cover film and a lower roller to role up the cover film;

wherein:

the plural sheet shaped optical elements are arranged on the base film in a row;

the base film and the cover film hold the sheet shaped optical elements between them; and by rolling up by the upper and lower rollers, the sheet shaped optical elements can be picked out.

According to the invention concerning the fourth type of the sheet shaped optical element, as the plural sheet shaped optical elements are arranged on the base film in a row (i.e. in one row), it is convenient to treat them. Also, as the cover film and the base film holds the plural sheet shaped optical elements between them, protection effect is stable and adequate.

In addition, since the upper roller rolls up the cover film and a lower roller rolls up the cover film, and by the rolling up by the both rollers, the sheet shaped optical elements can be picked out, as a result, it is easy to treat the sheet shaped optical elements. It is convenient to supply, and use the sheet shaped optical elements to manufacture or to assemble. It is advantageous from the view of space as they are arranged in a row.

In the fourth type of the sheet shaped optical element package concerning the present invention, the plural sheet shaped optical elements in a row can be covered by the cover film in a manner that the cover film covers the them having a blank part (margin) on it, and the cover film and the base film holds the plural sheet shaped optical elements between them.

In the fourth type of the sheet shaped optical element package concerning the present invention, the base film and the cover film can hold the plural sheet shaped optical elements between them in a sandwich structure.

In the fourth type of the sheet shaped optical element package concerning the present invention, the sheet shaped optical element can have the optical direction. And as each of the sheet shaped optical elements, it can be used as described next. That is, the sheet shaped optical element which has plural prisms whose sectional view is a triangle, the ridge corresponding to an apex of the triangle of each prism faces the opposite side to sheet shaped substrate, the surface of the prism against the ridge is combined with the sheet shaped substrate as one body, and the ridge of each prism runs parallel with each other.

In the fourth type of the sheet shaped optical element package concerning the present invention, the following structure can be used. Namely, the structure in which the plural sheet shaped optical elements being arranged on the base film in a row, and the base film and the cover film hold the sheet shaped optical elements between them, is rolled up to form reel shape, or the structure is folded to form a Z shape in a unit of each sheet shaped optical element.

A method of use of sheet shaped optical elements is as follows, and this performs the above object of the present invention:

A method for use of sheet shaped optical elements by using a sheet shaped optical element package, the package comprising a base film, plural sheet shaped optical elements carried on the base film, and a cover film formed on the plural sheet shaped optical elements, and the base film and the cover film hold the sheet shaped optical elements between them, the method comprising:

rolling up the cover film by an upper roller, rolling up the base film by a lower roller, and through these processes picking up the sheet shaped optical elements to deliver them to the next process.

In this invention, "use" means picking up the sheet shaped optical elements using sheet shaped optical element package delivered, and supplying them, manufacturing them, or assemble them and the like.

According to this invention, as the plural sheet shaped optical elements are arranged on the base film in a row (i.e. in one row), it is convenient to treat them. Also as the cover film and the base film hold the plural sheet shaped optical elements between them, protection effect is stable and adequate.

In addition, since the upper roller rolls up the cover film and a lower roller rolls up the cover film, and by the rolling up by the both rollers, the sheet shaped optical elements can be picked out, and as a result, it is easy to treat the sheet shaped optical elements. It is convenient to supply, and use the sheet shaped optical elements to manufacture or to assemble. It is advantageous from the viewpoint of space as they are arranged in a row.

In the method of use of sheet shaped optical elements, the above surface of the plural sheet shaped optical elements in a row can be covered by the cover film in a manner such that the cover film covers the sheet shaped optical elements having blank part on it, and the cover film and the base film can hold the plural sheet shaped optical elements between them.

In the method of use of sheet shaped optical elements, the base film and the cover film can hold the plural sheet shaped optical elements between them in a sandwich structure.

In the method of use of sheet shaped optical elements, the sheet shaped optical element can have the optical direction. As each of the sheet shaped optical elements, it can be used as described next. That is, the sheet shaped optical element which has plural prisms whose sectional view is a triangle, the ridge corresponding to an apex of the triangle of each prism faces to the opposite side to sheet shaped substrate, the surface of the prism against the ridge is combined with the sheet shaped substrate as one body, and the ridge of each prism runs parallel with each other.

In the method of use of sheet shaped optical elements, the following structure can be used. Namely, the structure in which the plural sheet shaped optical elements being arranged on the base film in a row, and the base film and the cover film hold the sheet shaped optical elements between them, is rolled up to form reel shape, or the structure is folded to form a Z shape in a unit of each sheet shaped optical element.

The first type of the method of manufacturing a sheet shaped optical element package is as follows, and by this, the above object of the present invention is performed:

A method of manufacturing a sheet shaped optical element package to use for producing a sheet shaped optical elements assembly comprising at least a structure in which a first sheet shaped optical element and a second sheet shaped optical element, whose optical direction makes a right angle with an optical direction of the first sheet shaped optical element are piled in this order, the method comprising:

conveying or stocking the first sheet shaped optical element and the second sheet shaped optical element in a condition such that both optical directions are the same;

turning the first sheet shaped optical element 90—and placing it on the base film; and placing the second sheet shaped optical element on the base film without changing its direction;

or;

placing the first sheet shaped optical element on the base film without changing its direction; and turning the second sheet shaped optical element 90—and placing it on the base film;

wherein:

through the processes, the first sheet shaped optical element and the second sheet shaped optical element are placed on the base film in this order in such a manner that the second sheet shaped optical element has an optical direction which makes a right angle with an optical direction of the first sheet shaped optical element;

the base film on which the first sheet shaped optical element and the second sheet shaped optical element are placed is covered by a cover film; and a sheet shaped optical element package is obtained in which the first sheet shaped optical element and the second sheet shaped optical element, whose optical direction makes a right angle with the optical direction of the first sheet shaped optical element, are piled in this order between the base film and the cover film along the longitudinal direction of the films.

In this invention, "convey" means to transfer by belt or the like, "stock" means to store in a box or the like and in necessary, taking out from there.

According to the invention concerning this method of manufacturing a sheet shaped optical element package, it can be easy and conveniently performed to manufacture a sheet shaped optical element package to use for producing a sheet shaped optical elements assembly comprising at least the structure in which the first sheet shaped optical element, and the second sheet shaped optical element, whose optical direction makes a right angle with the optical direction of the first sheet shaped optical element, are piled in this order. It is also possible to automate the process.

In the method of manufacturing a sheet shaped optical element package, following embodiment can be applied.

In the invention, the other element(s) necessary to be constructed into the sheet shaped optical elements assembly is (are) placed in a position next to the second sheet shaped optical element on the base film in the order corresponding to the pile order; and the sheet shaped optical element package is obtained in which the first sheet shaped optical element, the second sheet shaped optical element whose optical direction makes a right angle with the optical direction of the first sheet shaped optical element, and the other necessary element(s) are piled in this order between the base film and the cover film.

In the method of manufacturing a sheet shaped optical element package, following embodiment can be applied.

In the invention, the first sheet shaped optical element and the second sheet shaped optical element both have plural prisms having a sectional view which is a triangle, the ridge corresponding to an apex of the triangle of each prism faces the opposite side to a sheet shaped substrate, the surface of the prism against the ridge is combined with the sheet shaped substrate as one body, and the ridge of each prism runs parallel with each other; and the first sheet shaped optical element and the second sheet shaped optical element are conveyed or stocked in a condition such that the directions of the ridges of the prisms are in the same.

In the method of manufacturing a sheet shaped optical element package, following embodiment can be applied.

In the invention, at least one of the diffusion sheet, light guide, and reflector sheet is placed in a position next to the second sheet shaped optical element on the base film, film; and the sheet shaped optical element package is obtained in which the first sheet shaped optical element, the second sheet shaped optical element whose optical direction makes a right angle with the optical direction of the first sheet shaped optical element, and at least one of the diffusion sheet, light guide, and reflector sheet are piled in this order between the base film and the cover film.

The first type of the device for manufacturing a sheet shaped optical element package is as follows, and by this, the above object of the present invention is performed:

A device for manufacturing a sheet shaped optical element package to use for producing a sheet shaped optical elements assembly comprising at least a structure in which a first sheet shaped optical element, and a second sheet shaped optical element, whose optical direction makes a right angle with the optical direction of the first sheet shaped optical element, are piled in this order, the device comprises:

plural means for picking up and placing the sheet shaped optical elements;

each of the plural means is constructed in such a manner that it can turn the sheet shaped optical elements around a desired angle after picking up and placing them on the base film;

the first sheet shaped optical element and the second sheet shaped optical element are picked up in a condition such that both optical directions are the same;

either the first sheet shaped optical element or the second sheet shaped optical element is picked up and turned by the plural means around 90—and is placed on the base film; and through the processes, the device places the first sheet shaped optical element and the second sheet shaped optical element on the base film in this order along the longitudinal direction of the film.

In the method of the first type of the device for manufacturing a sheet shaped optical element package, following embodiment can be applied.

In the invention, the first sheet shaped optical element and the second sheet shaped optical element both have plural prisms having a sectional view which is a triangle, a ridge corresponding to an apex of the triangle of each prism faces the opposite side to a sheet shaped substrate, a surface of the prism against the ridge is combined with a sheet shaped substrate as one body, and the ridge of each prism runs parallel with each other; and the first sheet shaped optical element and the second sheet shaped optical element are placed on the base film in a condition such that the directions of the ridges of the prisms of the second sheet shaped optical element make a right angle with the ridges of the prisms of the first sheet shaped optical element.

According to the invention concerning the first type of the device for manufacturing a sheet shaped optical element package, it can be easy and conveniently performed to manufacture a sheet shaped optical element package to use for producing a sheet shaped optical elements assembly comprising at least the structure in which the first sheet shaped optical element, and the second sheet shaped optical element, whose optical direction makes a right angle with the optical direction of the first sheet shaped optical element are piled in this order. It is also possible to automate the process.

The second type of the method of manufacturing a sheet shaped optical element package is as follows, and by this, the above object of the present invention is performed:

A method of manufacturing a sheet shaped optical element package, the method comprising:

on a predetermined position on a film or on a sheet shaped tray, a first sheet shaped optical element and a second sheet shaped optical element, whose optical direction makes a right angle with an optical direction of the first sheet shaped optical element, are piled in this order;

covering by the cover film; and through the processes, obtaining the sheet shaped optical element package in which the first sheet shaped optical element and the second sheet shaped optical element, whose optical direction makes a right angle with the optical direction of the first sheet shaped optical element, are piled between the film or the sheet shaped tray and the cover film.

According to the invention concerning this method of manufacturing a sheet shaped optical element package, it can be easy and conveniently performed to manufacture a sheet shaped optical element package to use for producing a sheet shaped optical elements assembly comprising at least the structure in which the first sheet shaped optical element, and the second sheet shaped optical element, whose optical direction makes a right angle with the optical direction of the first sheet shaped optical element, are piled in this order. It is also possible to automate the process.

In this method of manufacturing a sheet shaped optical element package described above, following embodiment can be applied.

In the invention, the first sheet shaped optical element and the second sheet shaped optical element both have plural prisms whose sectional view is a triangle, the ridge corresponding to an apex of the triangle of each prism faces the opposite side to a sheet shaped substrate, the surface of the prism against the ridge is combined with the sheet shaped substrate as one body, and the ridge of each prism runs parallel with each other;

the first sheet shaped optical element and the second sheet shaped optical element are conveyed or stocked in a condition such that the directions of the ridges of the prisms are in the same.

The second type of the device for manufacturing a sheet shaped optical element package is as follows, and by this, the above object of the present invention is performed:

A device for manufacturing a sheet shaped optical element package to use for producing a sheet shaped optical elements assembly comprising at least a structure in which a first sheet shaped optical element, and a second sheet shaped optical element, whose optical direction makes a right angle with an optical direction of the first sheet shaped optical element, are piled in this order, the device comprising:

plural means for picking up and placing the sheet shaped optical elements;

each of the plural means is constructed in such a manner such that it can turn the sheet shaped optical elements around a desired angle after picking up and placing them on a predetermined position on the base film or on the sheet shaped tray;

the first sheet shaped optical element and the second sheet shaped optical element are picked up in a condition such that both optical directions are in the sane;

either the first sheet shaped optical element or the second sheet shaped optical element is picked up and turned by the plural means around 90—and is placed on the base film; and the first sheet shaped optical element and the second sheet shaped optical element are piled in a condition such that a direction of the second sheet shaped optical element makes a right angle with an optical direction of the first sheet shaped optical element.

According to the invention concerning the second type of the device for manufacturing a sheet shaped optical element package, it can be easy and conveniently performed to manufacture a sheet shaped optical element package to use for producing a sheet shaped optical elements assembly comprising at least the structure in which the first sheet shaped optical element, and the second sheet shaped optical element whose optical direction makes a right angle with the optical direction of the first sheet shaped optical element are piled in this order. It is also possible to automate the process.

In this device of manufacturing a sheet shaped optical element package described above, following embodiment can be applied.

In the invention, the first sheet shaped optical element and the second sheet shaped optical element both have plural prisms whose sectional view is a triangle, the ridge corresponding to an apex of the triangle of each prism faces the opposite side to a sheet shaped substrate, the surface of the prism against the ridge is combined with the sheet shaped substrate as one body, and the ridge of each prism runs parallel with each other;

the first sheet shaped optical element and the second sheet shaped optical element are conveyed or stocked in a condition such that the directions of the ridges of the prisms are the same.

The third type of the method of manufacturing a sheet shaped optical element package is as follows, and by this, the above object of the present invention is performed:

A method of manufacturing a sheet shaped optical element package, the method comprising:

on a predetermined position of a base film, a first sheet shaped optical element and a second sheet shaped optical element, whose optical direction makes a right angle with an optical direction of the first sheet shaped optical element, are piled in this order, order;

covering by the cover film; and through the processes, obtaining the sheet shaped optical element package in which the first sheet shaped optical element and the second sheet shaped optical clement, whose optical direction makes a right angle with the optical direction of the first sheet shaped optical element, are pilled between the base film and the cover film.

According to the invention concerning this method of manufacturing a sheet shaped optical element package, it can be easy and conveniently performed to manufacture a sheet shaped optical element package having the structure where the sheet shaped optical element and other necessary element(s) are piled on the base film directly. It is also possible to automate the process.

The third type of the method of manufacturing a sheet shaped optical element package is as follows, and by this, the above object of the present invention is performed:

A method of manufacturing a sheet shaped optical element package, the method comprising:

on a predetermined position of a base film, a first sheet shaped optical element and a second sheet shaped optical element are piled in this order;

each of the sheet shaped optical elements has plural prisms having a sectional view which is a triangle, a ridge corresponding to an apex of the triangle of each prism faces an opposite side to a sheet shaped substrate, a surface of the prism against the ridge is combined with the sheet shaped substrate as one body, and the ridge of each prism runs parallel with each other;

the first sheet shaped optical element and the second sheet shaped optical element are piled in a condition such that the directions of the ridges of the prisms of the second sheet shaped optical element make right angle with the ridges of the prisms of the first sheet shaped optical element;

covering by the cover film; and through the processes, obtaining the sheet shaped optical element package in which the first sheet shaped optical element and the second sheet shaped optical element, are piled between the base film and the cover film.

According to the invention concerning this method of manufacturing a sheet shaped optical element package, it can be easy and conveniently performed to manufacture a sheet shaped optical element package, that has the structure where the effective sheet shaped optical element with above mentioned prism and other necessary element(s) are piled on the base film directly. It is also possible to automate the process.

The specification of Japanese patent application laid open publication No. Heisei 5-203950 (203950/1993) describes an optical elements packaging body which can easily distinguish the front side from the back side of the elements. However there is not any description concerning the optical direction, the assembling of the packaging body itself, nor the convenience at the time of treating or placing the elements using the packaging body.

BRIEF DESCRIPTION OF THE DRAWINGS

FIG. 14 illustrates a sheet shaped optical element used in examples of the present invention.

DESCRIPTION OF THE PREFERD EMBODIMENTS

Figure 1:
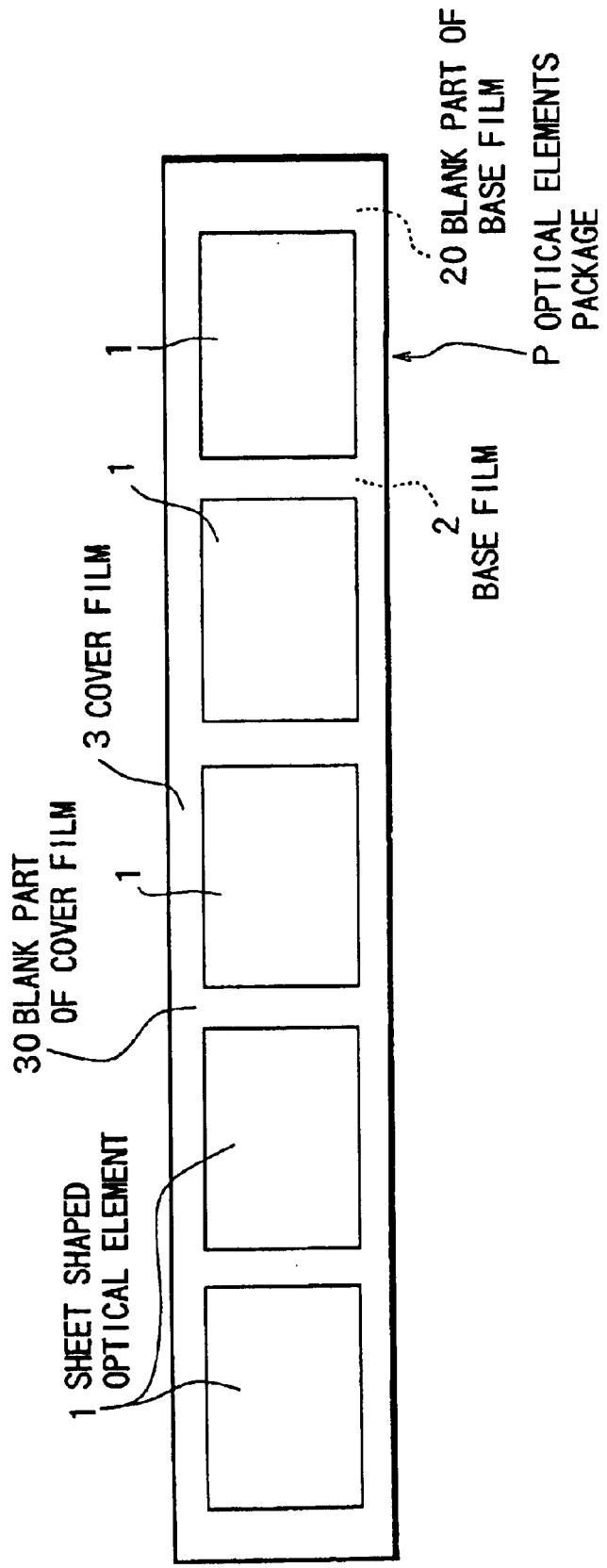
FIG. 1 is a front view of a sheet shaped optical element package of example 1 of the present invention.

Below, the preferred embodiments are described in detail referring to the drawings. The embodiments described hereafter, however, do not limit the present invention.

EXAMPLE 1

The first example is an embodiment in which the present invention is applied to a sheet shaped optical element package used in a back light system. The back light system lights a panel of liquid crystal display of a mobile phone, a hand terminal of the information system (i.e., PDA), a digital camera, a hand game machine, and the like. In this example, a prism sheet, having light collecting effects and light refracting effects, is used as a sheet shaped optical element. The collecting effects and the light refracting effects of the sheet shaped optical element (prism sheet) used in this example are designed in such a manner that the light from the source is distributed throughout the whole surface of the display equally. It is possible, however, to design the effects in order to obtain any other desired light distribution on the display surface according to necessary specifications.

The first embodiment is depicted in FIGS. 1 to 4. In this example, each of the package products has a form in which element(s) between protection sheets (base film 2 and cover film 3) are arranged in a same direction. In this embodiment, sheet shaped optical elements are all arranged all in the same direction as shown in FIG. 1, and are packaged like a wrapper form between the protection sheets.

Figure 2:
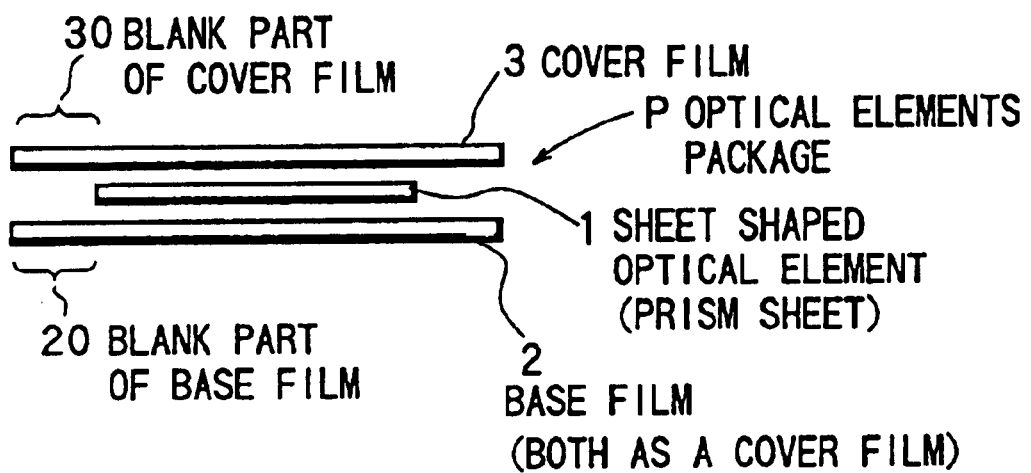
FIG. 2 is a sectional view of a sheet shaped optical element package of example 1 of the present invention.

As shown in FIGS. 1 and 2, in the sheet shaped optical element package P, plural sheet shaped optical elements 1 are arranged in the form of a line on a base film 2 as mentioned above. The base film 2 is tape shaped, and it carries the arranged sheet shaped optical elements in a manner as discussed next. Namely, the part other than a part where the sheet shaped optical elements are placed, is kept as a blank part (margin) 20 on the surface of the base film 2. Likewise, the cover film 3 covers the arranged sheet shaped optical elements kept as the blank part (margin) 30. That is, each sheet shaped optical element is wrapped by the cover film 3 having the blank part (margin) 30.

Consequently, it is easy to take out the sheet shaped optical element from the wrapper by removing the cover film 3. Similarly, it is easy to separate the base film from the sheet shaped optical element.

The base film 2 and the cover film 3 used in this example are the same size both in width and length. Between the base film 2 and the cover film 3, both having the same shape, sheet shaped optical elements are placed like a sandwich construction. As mentioned earlier, since the base film 2 and the cover film 3 carry sheet shaped optical elements with blank parts (margins) 20, 30, the sheet shaped optical elements never lay bare. In addition, it is possible that the sheet shaped optical elements are protected against outside contamination. They are surely protected in this example.

Each sheet shaped optical element 1 in the sheet shaped optical element package P in this example is a prism sheet as constructed below. The prism sheet has a certain specific light direction for the following reason.

Referring to FIG. 14, on one side surface of each sheet shaped optical element 1 used in this example, there are formed plural prisms 131*a*, 131*b*, etc., each sectional view of which is a triangle. The ridge (edge) 132*a*, 132*b*, etc., corresponding to an apex of the triangle of each prism faces toward the opposite side to the sheet shaped substrate 130. That is to say, each prism faces toward the upper side of the drawing. The surface of the prism against the ridge (edge) is combined with the sheet shaped substrate 130 as one body. In this example, many prisms 131*a*, 131*b*, etc., having a triangle shape in sectional view, are formed on the sheet shaped substrate 130, and are formed into a prism sheet.

The ridge (edge) 132*a*, 132*b*, etc., of each prism runs parallel to one another. Each sheet shaped optical element 1 is supported in such a way that the base film 2 carries it. The surface on which the prisms 131*a*, 131*b*, etc., are formed is located in the sheet shaped optical element package on the opposite side to the base film 2. That is, the surface on which prisms are formed is located on the upper side of FIG.2.

The detailed structure of the sheet shaped optical element 1 used in this example is as follows. The summit angle of the prism is 90°. The summit angle is an angle of the triangle in the sectional view corresponding to the ridge (edge) 132*a*, 132*b*, etc., of prism 131*a*, 131*b*, etc. The prism pitch is 50 µm. That is to say, twenty prisms are formed within one mm. A large number of prisms are formed in such a manner. The sheet shaped substrate 130 is made from transparent resin such as polyester resin. Each prism 131*a*, 131*b*, etc., is made from resin having an excellent optical nature such as transparent acrylic resin. The prisms 131*a*, 131*b*, etc., made from transparent resin are formed as one body on the shaped substrate 130 which is made from resin. Consequently, the sheet shaped optical element 1 in this example is formed. The thickness of the sheet shaped substrate 130 is approximately 120 µm, and the thickness of the sheet shaped substrate 130 containing prisms 131*a*, 131*b*, etc., is 150 µm.

The sheet shaped optical element 1 is constructed in such a manner that the light from the back light source (from the direction of the shaped substrate 130) is, after refraction and reflection, collected mainly to the ridge (edge) 132*a*, 132*b*, etc., of prism 131*a*, 131*b*, etc. Consequently, the light is controlled and collected on the ridge (edge) 132*a*, 132*b*, etc., of prism 131*a*, 131*b*, etc. As a result, brightness on it is enhanced in the direction that is orthogonal to the ridge (edge), i.e. the Y direction in the drawing. In the distribution of light in the direction along the ridge of the triangular prism, i.e. the X direction in the drawing, the effect of the collection of light is rather weak.

The ratio of advance of the brightness of the light is set as 1.5. In this specification, the ratio of advance of the brightness of the light means a rate of advance of the brightness in comparison with the brightness of the light when the sheet shaped optical element 1 is not used. Therefore, the collecting effect in this example gives enhancement of 50% of the brightness of the light.

As described later, there is a case in which two sheets of the sheet shaped optical element 1 are used in such a manner that the optical directions are orthogonal to each other, namely the ridges 132*a*, 132*b*, etc., of prisms 131*a*, 131*b*, etc., make a right angle to each other. By using such a manner, the ratio of advance of the brightness of the light is 2.0. That is, the brightness is doubled.

It is possible to adjust the angle of the field of view by using the sheet shaped optical element 1 with a specific optical direction. In this example, when the sheet shaped optical element 1 is used in such a manner that the direction of the ridges 132*a*, 132*b*, etc., of prisms 131*a*, 131*b*, etc., as mentioned above, is arranged along the up and down direction on the display, the angle of the field of view can be adjusted to ±50° in the horizon. In other words, within the view scope between 50° right or left from the normal position, from any direction, the display can be seen clearly.

Perpendicularly, the angle of the field of view is within ±35° in this example. The angle of the field of view, in this specification, is determined by brightness that is 50% lower compared with the brightness given when seeing the display squarely.

The sheet shaped optical element package P in this example can be conveyed, stocked, and delivered as follows.

Figure 3A:
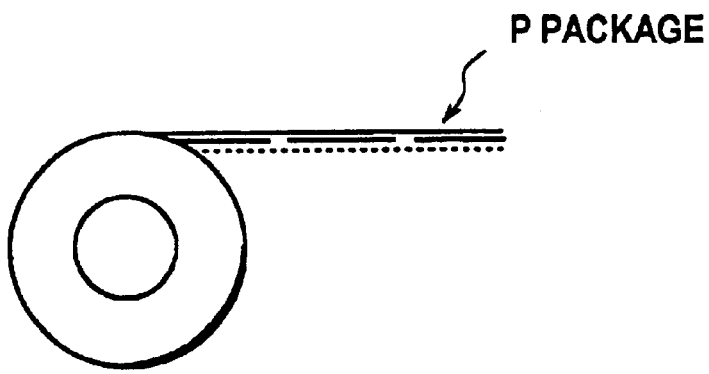
FIG. 3 illustrates an embodiment of a supplying form of a package of example 1 of the present invention (single reel form and z-shaped folding form).
Figure 3B:
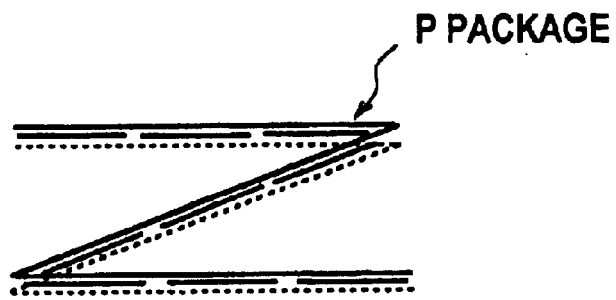

The embodiment shown in FIG. 3(*a*) is an example in which the optical element package P is arranged in the form of a single line film, and is rolled up into a reel shape.

The embodiment shown in FIG. 3(*b*) is an example in which the optical element package P is folded into a form of a Z shape, in which a unit of it contains one set of sheet shaped optical element 1, base film 2, and cover film 3.

In both embodiments, the optical element package P can be stocked and kept, and they are easily conveyed and delivered. The embodiments are both very convenient.

Figure 4:
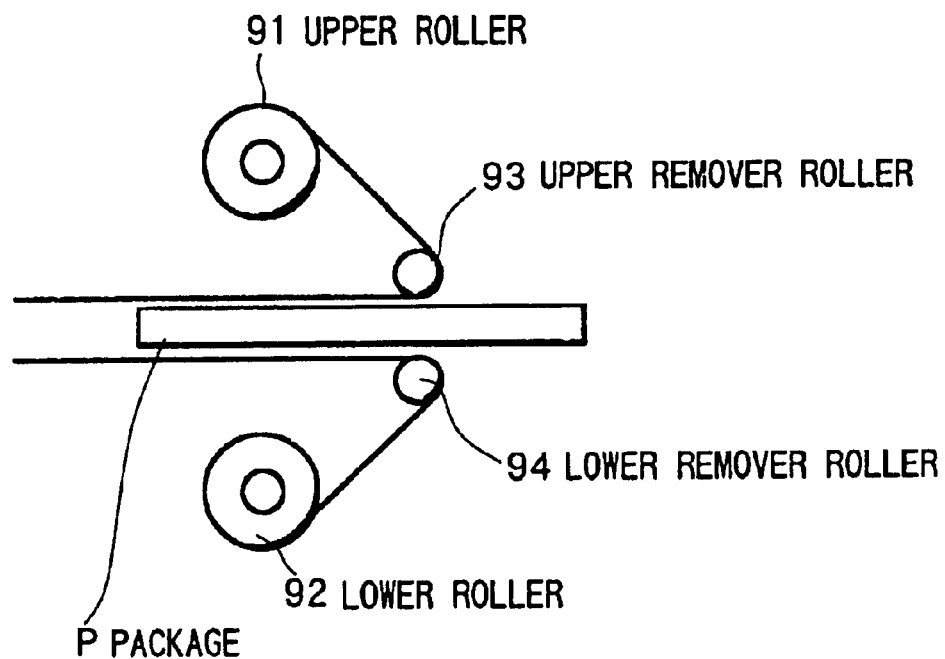
FIG. 4 illustrates an embodiment of using the package of example 1 of the present invention (cover films are removed by the remover rollers and rolled up by the rollers).

FIG. 4 shows an example of the state when the sheet shaped optical element 1 is taken out, in order to use the element 1 to be assembled, from the sheet shaped optical element package P. In this example, the upper roller 91 used to roll up the cover film 3 is placed above the sheet shaped optical element package P, and the lower roller 92 used to roll up the base film 2 is placed below the sheet shaped optical element package P, as shown in the drawing. The sheet shaped optical element package P is located between the upper remover roller 93 positioned near the cover film 3 side, and the lower remover roller 92 positioned near the base film 2 side. When the sheet shaped optical element package P runs between the remover rollers 92, 93, the cover film 3 is removed from the package P by the upper remover roller 93 and reeled off by the upper roller 91, and at the same time the base film 2 is removed from the package P by the lower remover roller 92 and reeled off by the lower roller 92.

At that time, as the sheet shaped optical element is carried by the cover film 3 and the base film 2 each of which has blank part (margin) 20, 30, the blank part (margin) 20, 30 makes room for handling and, as a result, it is easy to remove the films 2, 3 from the sheet shaped optical element package P. Thus, the films 2, 3 can be removed and the sheet shaped optical element can be taken out conveniently without difficulties.

By removing the base film 2 and the cover film 3 as described above, the sheet shaped optical element 1 is taken out to be used.

Figure 8:
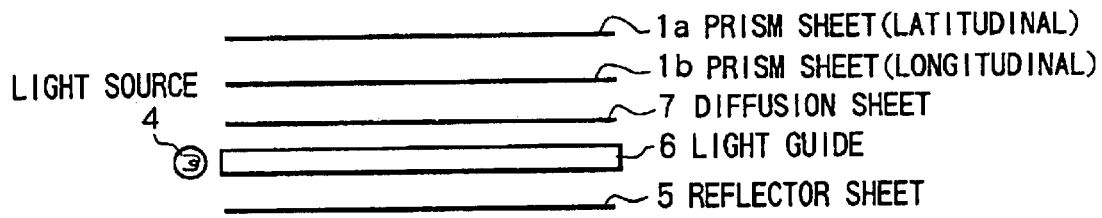
FIG. 8 illustrates a prior art.
Figure 9:
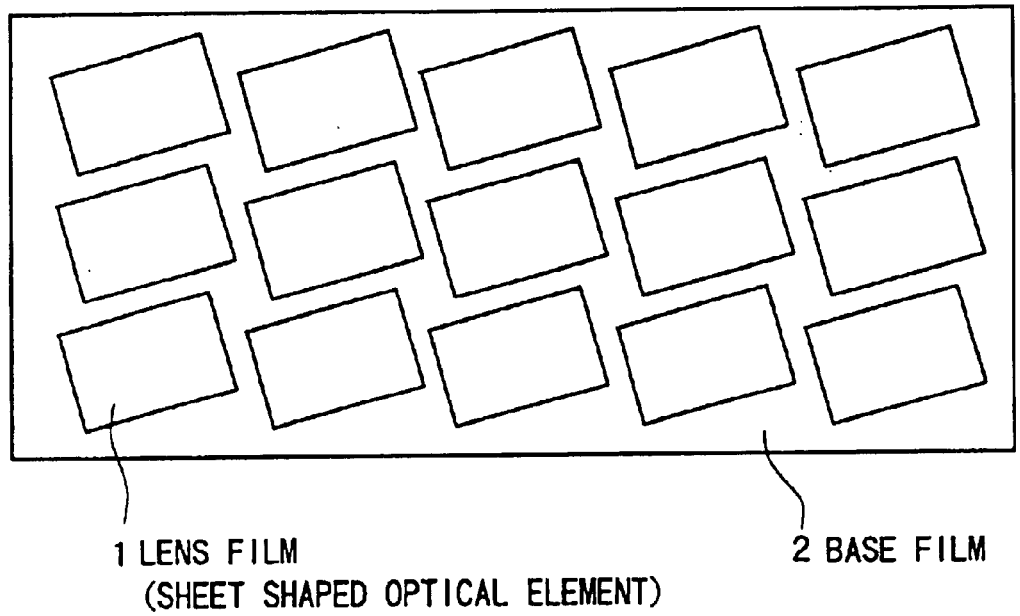
FIG. 9 is a front view of a prior art package construction.
Figure 10:
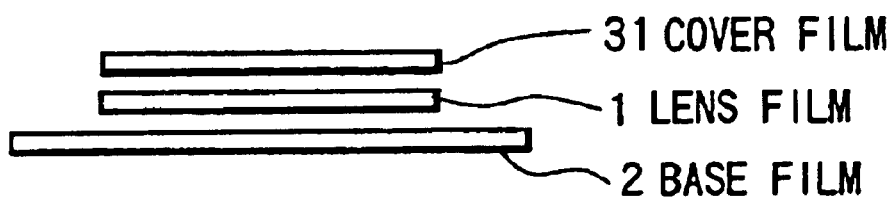
FIG. 10 is a sectional view of a prior art package construction.

In this example, the sheet shaped optical element 1 is used to get the liquid crystal display structure shown in FIG. 8. In this example, either one sheet of the sheet shaped optical element 1 can be used to complete the structure, or two sheets of the sheet shaped optical element 1 whose optical directions are orthogonal to each other can be used to complete the structure. In generally, it is effective to use a pair of sheet shaped optical elements that are, in optical direction, orthogonal to each other. As a result, the brightness is enhanced and the illumination on the display is made consistent. But, as in this example, the employment of one sheet of prism, which is efficient in light collecting and which corresponds to the optical direction, provides satisfactory results to a specific use.

As mentioned above, it is easy to treat the sheet shaped optical element and its package in this example. The sheet shaped optical element is protected sufficiently and stably. Supply, assemble, and affixing of the sheet shaped optical elements can be conveniently performed. Since they are arranged in one line form, it is advantageous in regard to space.

EXAMPLE 2

Figure 5:
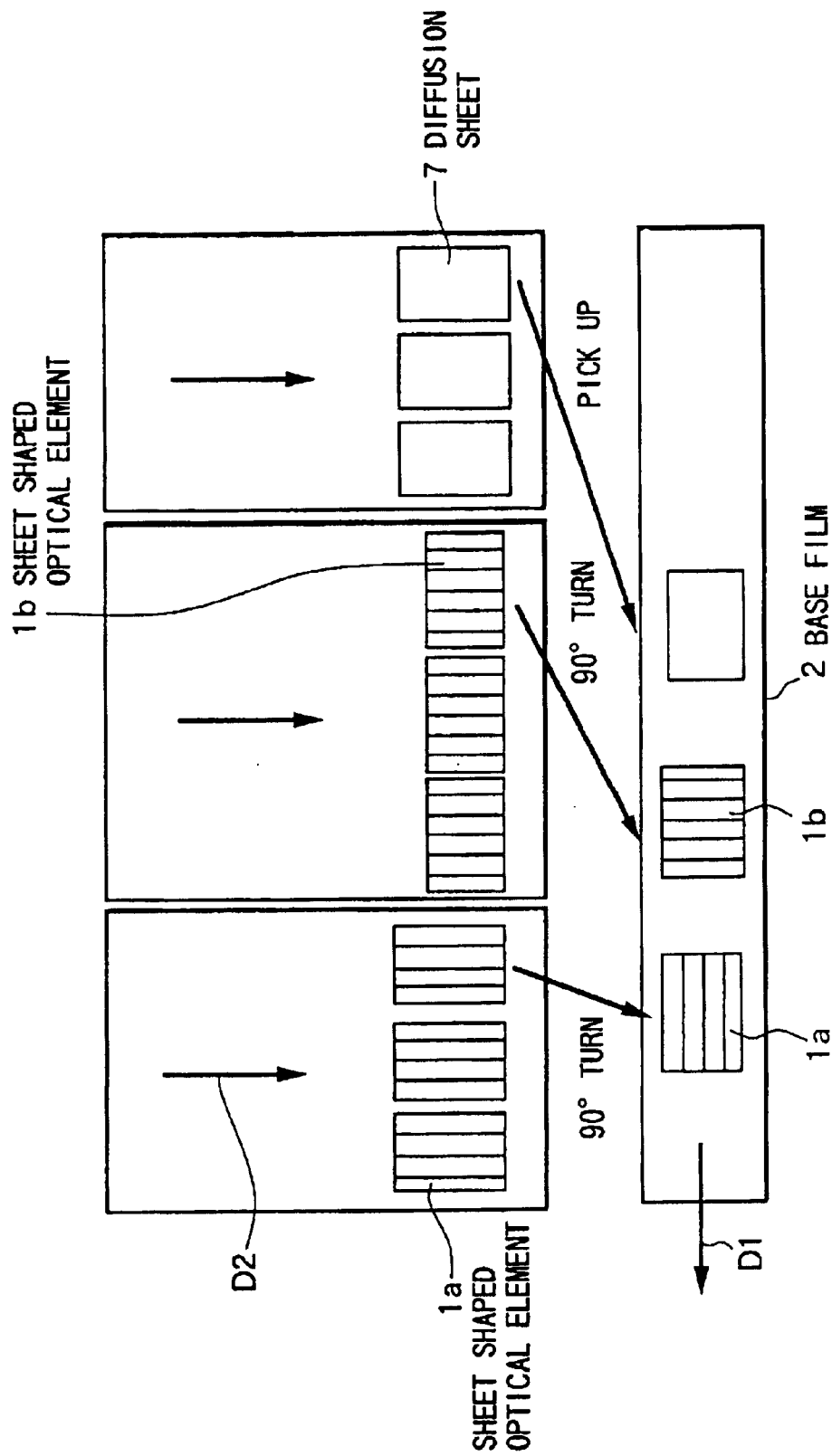
FIG. 5 illustrates a construction of packaging of the sheet shaped optical elements in example 2 of the present invention.
Figure 6:
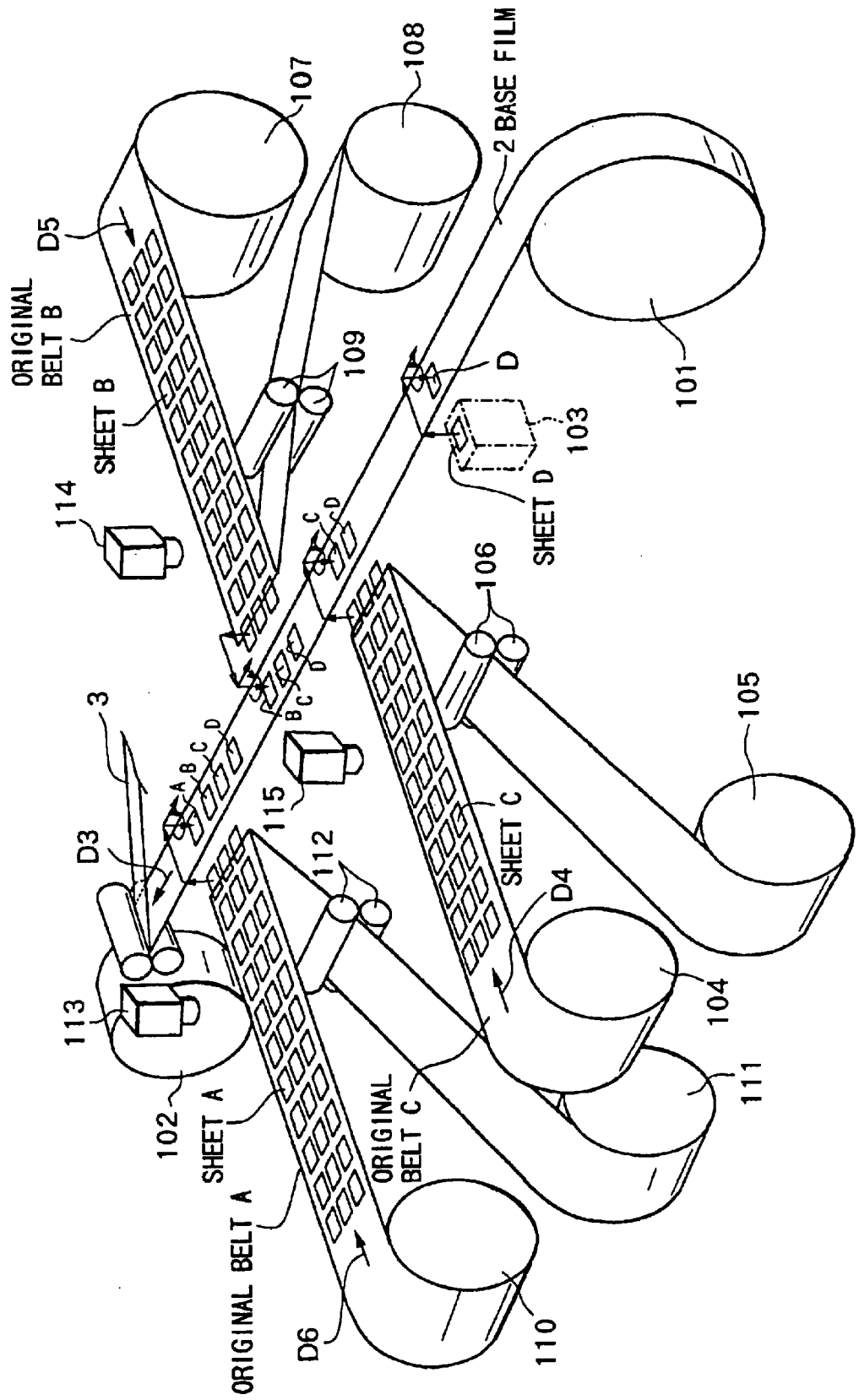
FIG. 6 illustrates an example of automatic packaging of the sheet shaped optical elements, and illustrates a device for manufacturing a sheet shaped optical element package.

Referring to FIGS. 5 and 6, provided next is a description of the second example of the present invention.

In this example, an assembly is provided having at least the first sheet shaped optical element 1a, and the second sheet shaped optical element 1b whose optical direction is orthogonal to that of the first sheet shaped optical element 1a. In the assembly, the second sheet shaped optical element 1b is arranged on the first sheet shaped optical element 1a.

In this example referring to FIG. 5, the sheet shaped optical element 1a, the sheet shaped optical element 1b whose optical direction is orthogonal to that of the sheet shaped optical element 1a, and the other elements necessary to construct the sheet shaped optical element package P, such as the refractory sheet 7, are conveyed in the direction D2 orthogonally oriented to the direction D1 of the base film 2 on which the elements are to be placed. Thus, the sheet shaped optical element 1a, the sheet shaped optical element 1b, and other elements such as the refractory sheet 7 are placed in this order on the base film 2.

Although each sheet shaped optical element 1a, sheet shaped optical element 1b, and refractory sheet 7, and other element(s) are delivered in three rows as shown in the drawing, they can be provided in any number of rows such as, for example, in one row. The number of row(s) of the sheets can be different from that of another. Finally they must be placed on the base film 2 in proper order.

In this invention, the first sheet shaped optical element 1a and the second sheet shaped optical element 1b are conveyed or stocked in a condition such that both elements are in the same optical directions. According to the invention, in this example, the first sheet shaped optical element 1a and the second sheet shaped optical element 1b are conveyed in a condition such that both optical directions are all the same.

Both the first sheet shaped optical element 1a and the second sheet shaped optical element 1b are, as shown by vertical lines in FIG. 5, conveyed in a condition such that both optical directions are all the same.

In this example, the first sheet shaped optical element 1a, conveyed in the direction D2, is rotated 90° to the conveyed direction, and then is put on the base film 3. The second sheet shaped optical element 1b is then placed without rotation on the next position of the base film 3, and they are formed into one row.

Consequently, the first sheet shaped optical element 1a and the second sheet shaped optical element 1b are arranged on the base film 3 in a manner such as their optical directions are orthogonal to each other.

In this example, the first sheet shaped optical element 1a is conveyed along the direction D2. That is, the longitudinal direction of the element 1a at the time when it is conveyed is the same as D2. The second sheet shaped optical element 1b is conveyed across the direction D2. That is, the longitudinal direction of the element 1b at the time when it is conveyed, is orthogonal to D2. Either of the elements 1a or 1b, and the element 1a in this example is rotated 90° and placed on the base film 2 as mentioned above. As a result, longitudinal directions of the elements 1a, 1b on the base film are all the same. Since both sheet shaped optical elements 1a, 1b have the same shape, the two elements 1a, 1b can be piled in the same position on the base film 2. As a result, the obtained package is convenient to use at the time when the sheet shaped optical elements 1a, 1b in it are picked up and are assembled afterward.

As shown in the drawing, in this example, the first sheet shaped optical element 1a is rotated 90° when it is picked up and placed on the base film. The second sheet shaped optical element 1b does not change its direction when it is picked up and put on the next position on the base film. However, the reverse can be accepted, that is, the first sheet shaped optical element 1a can be placed on the base film in its direction, and the second sheet shaped optical element 1b can be rotated 90° and put on the base film. According to the necessary mechanical specification, convention in the after process, users demands, and the like of, any embodiment can be accepted.

The refractory sheet 7 which is put on next is rotated 90° in this example. The necessity of such rotation is also determined by the accepted direction of the sheet 7.

As mentioned above, the sheet shaped optical element 1a, the sheet shaped optical element 1b, and other elements such as refractory sheet 7 are arranged in one row. Thus, the sheet shaped optical elements package is obtained.

In order to prepare the light system shown in FIG. 8 by using the above sheet shaped optical elements package, the process can be completed only by piling the elements according to their positional order. It is very easy and convenient to assemble them to get the products. It is possible to prevent damage on the surface of the sheet shaped optical element 1a, 1b. The rate of occurrence of the defects of an appearance of the products also decreases. An error in assembling can also be prevented, and the stability of the quality of the products is enhanced. The time necessary to assemble can be shortened. For example, when the process is mechanized, the necessary time of the process can be shortened by several times in comparison with the manual prior process. The labor cost can be reduced, and thus, the products can be obtained at a much lower cost.

The following is an explanation concerning optical directions of the sheet shaped optical element 1a and the sheet shaped optical element 1b used in this example. Both of the sheet shaped optical element 1a and the sheet shaped optical element 1b are efficient in light collecting.

An optical direction of an optical element device (i.e., the direction to which the light, especially the light from the source, is introduced) is provided by any means, for example, through a refractory material or the like. In this specification, the optical direction means the direction to which the light is collected.

The nature of the optical direction of the optical element can be employed to give the equal illumination on the whole display surface when the light is introduced from a point or a line source. The light from the point source is, for example, a light from an LED element, or a lamp. The light from the line source is, for example, light from a fluorescent light tube, or a line shaped LED element. The decision of the optical direction, namely, from what direction the light should be collected, differs in accordance with the position of the light source, and with the requested distribution of brightness on the display. It cannot be determined in one manner. Generally, it is desired to illuminate the whole surface of display equally with sufficient brightness. Therefore, in this example, the direction that provides such illumination is accepted. Other manners can be used such as a certain specific part, for example, the part in which letters appear, or the part in which images appear, should be specially illuminated. The direction that provides special brightness to a local area of the display can be employed according to the specification.

In this example, optical directions of the sheet shaped optical element 1a and the sheet shaped optical element 1b form a right angle. By the structure, the brightness on the surface of the display is enhanced. It also provides a desired degree of field of view necessary to see the display clearly.

Detailed structure of each sheet shaped optical element 1a and the sheet shaped optical element 1b used in this example is as follows. Each element is a prism sheet constructed as discussed below. Each has a specific optical direction.

Referring to FIG. 14, each sheet shaped optical element 1a and the sheet shaped optical element 1b used in this example is constructed as shown by sheet shaped optical element 1. Plural prisms 131a, 131b, etc., each sectional view of which is a triangle, are formed on the one side (the upper side) of the sheet shaped substrate 130. The ridge (edge) 132a, 132b, etc., corresponding to an apex of the triangle of each prism, faces the side opposite to the sheet shaped substrate 130. That is, it faces the upper side of the drawing. The surface of the prism against the ridge (edge) is combined with the sheet shaped substrate 130 as one body. In this example, many prisms 131a, 131b, etc., the sectional view of each of which is a triangle shape, are formed on the sheet shaped substrate 130, and are formed into a prism sheet.

The ridge (edge) 132a, 132b, etc., of each prism runs parallel to one another. The vertical lines illustrated on each sheet shaped optical element 1a and the sheet shaped optical element 1b in FIG. 5 are ridge (edge) lines of the prisms. As shown in FIG. 5, they are placed on the base film 2 in such a manner so that their optical directions are orthogonal to each other. The surface side on which the prisms 131a, 131b, etc., are formed is located on an opposite side of the base film 2 in the sheet shaped optical element package. That is, the prism side is on the upper side (i.e. on the side of the paper face on which a drawing is illustrated).

The angle of the prism of this sheet shaped optical element, (i.e. the angle of the apex of the sectional view, a triangle, corresponding to ridge (edge) 132a, 132b, etc., of prism 131a, 131b, etc.,) is 90°. The prism pitch is 50 μm. Namely, twenty prisms 131a, 131b, etc., are formed within one mm in width. A large number of prisms are formed in such a manner. The sheet shaped substrate 130 is made from transparent resin such as polyester resin. Each prism 131a, 131b, etc., is made from resin that has an excellent optical nature such as transparent acrylic resin. The prisms 131a, 131b, etc., made from transparent resin are formed as one body on the sheet shaped substrate 130 made from resin and, as a consequence, the sheet shaped optical element 1 in this example is formed. The thickness of the sheet shaped substrate 130 is approximately 120 μm. The thickness of the sheet shaped substrate 130 containing prisms 131a, 131b, etc., is 150 μm.

This sheet shaped optical element is constructed in such a manner that the light from the back light source (from the side of the shaped substrate 130) is, after refraction and reflection, collected mainly to the ridge (edge) 132a, 132b, etc., of prism 131a, 131b, etc. Consequently, the light is controlled and collected on the ridge (edge) 131a, 132b, etc., of prism 131a, 131b, etc. As a result, brightness on the ridge (edge) is enhanced. In the distribution of light in the direction along the ridge of the triangular prism (i.e., the X direction in the drawing), the effect of the collection of light is rather weak.

In this example, the ratio of advance of the brightness of the light is set as 1.5. A ratio of advance of the brightness of the light means a rate of advance of the brightness in comparison with the brightness of the light when the sheet shaped optical element 1 is not used. Therefore, the collecting effect of the light in this example provides, by using one sheet of the sheet shaped optical element, an enhancement of 50% of the brightness of the light. (This data is obtained when an LED is used as a light source.) In addition, in this example, two sheets of the sheet shaped optical element are used in such a manner that the optical directions are orthogonal to each other. As a result of this arrangement, the ratio of an enhancement of the brightness of the light become 2.0. That is, the brightness becomes doubled. Similarly in a foregoing example, the field of view can be controlled likewise in this example.

In this example, as shown in FIG. 5, two sheets of the sheet shaped optical element are put on the base film in such a manner that the ridge (edge) 131a, 132b, etc., of prism 131a, 131b, etc., of the one sheet makes a right angle with the ridge (edge) 131a, 132b, etc., of prism 131a, 131b, etc., of the other sheet. As a result, it become easy to pile the two sheets of the sheet shaped optical element in such a manner that the ridges (edges) 131a, 132b, etc., of prisms 131a, 131b, etc., make a right angle.

Hereafter, the automatic process of the packaging system is described referring to FIG. 6.

FIG. 6 shows a device used in this example for the packaging process. In the drawing, a base film 2 is provided. In the example shown in FIG. 6, the base film 2, which is rolled up by the supply roller 101, is conveyed along the direction D3. The base film 2 is plane on the way of transferring. In this condition, a sheet D is put on the base film 2. Then a sheet C is put on the base film 2, then a sheet B is put on the base film 2. Then a sheet A is put on the base film 2. As a result, the construction in which the sheets A, B, C, and D are arranged in a line on the base film 2 in this order is obtained. Further, the cover film is placed on the obtained construction. The obtained construction is rolled up by the reel up roller 102 again, and is stocked or delivered as a complete packaging product.

The sheet D is stocked in a storage box 103, and is picked up from the box 103, then is rotated as needed, and is placed on the base film.

The sheet C is supplied in such a condition that the sheet C is placed on an original belt C. The original belt C runs from the roller 104, that rolled up the original belt C, to the base film 2 in the direction D4. The direction D4 forms a right angle with the direction D4 in which the base film runs. Near the base film 2, a sheet C on the original belt C is picked up, then is rotated as needed, and then is placed on the base film 2. After the sheet C is picked up, the original belt C is turned in its direction and rolled up by the roller 105. A feed roller 106 introduces the original belt C to the roller 105.

The sheet B is supplied similarly as the aforementioned sheet C to the base film 2. In the drawing, the original belt B, on which the sheet B is placed, is supplied from the opposite or counter side to that of the original belt C of the base film 2 because the positions from which the original belt B, C is supplied are located on the opposite or counter sides of the base film from each other. In this example, the sheet B is supplied to the base film 2 from the right side of the drawing, and the sheets A and C are supplied to the base film 2 from the left side, namely, the sheets are supplied from both sides alternately.

The sheet B is supplied in the condition that the sheet B is put on the original belt B. The original belt B runs from the roller 107 which rolled up the original belt B, to the base film 2 in the direction D5. The direction D3, in which the base film runs, and the direction D5 of the original belt B form a right angle. As the sheet B is positioned in the opposite side to the sheet C, the sheet B runs from the opposite position to that of the sheet C. Near the base film 2, a sheet B on the original belt B is picked up, then is rotated as needed, and then is placed on the base film 2. After the sheet B is picked up, the original belt B is turned in its direction and rolled up by the roller 108, A feed roller 109 introduces the original belt B to the roller 108.

The sheet A is supplied along the same direction as the sheet C, and placed on the base film similarly as the sheet C mentioned above.

That is to say, the sheet A is supplied in the condition that it is put on an original belt A. The original belt A runs from the roller 110, which rolled up the original belt A, to the base film 2 in the direction D6. The direction D3, in which the base film runs, and the direction D6 of the original belt A form a right angle. Near the base film 2, the sheet A on the original belt A is picked up, then is rotated as needed, and then is put on the base film 2. After the sheet A is picked up, the original belt A is turned in its direction and rolled up by the roller 111. A feed roller 112 introduces the original belt A to the roller 111.

Any means can be used to pick up the sheets A to D. For example, a chucking machine by vacuum can be accepted to pick up the sheets. Each of the sheets A to D can be rotated or turned through necessary angles as needed. For instance, this can be through right angles, or other desired angles. This rotation can be performed by any kind of robot arm mechanism.

In the drawing, an image pickup device 113 is provided to watch the sheet A being placed on the original belt A. As the image pickup device, a CCD can be used. Similarly, an image pickup device 114 is provided to watch the sheet B being placed on the original belt B, and an image pickup device 115 is provided to watch the sheet C being placed on the original belt C. As each of the image pick up devices, a CCD can be used. These image pickup devices watch the sheets A to D on the original belts A to D so as to exclude the defective sheets. Those sheets placed in an unsuitable condition can be detected by the image pickup devices and can be excluded. For example, a sheet place in an inclined state that provides difficulties in the process can be excluded. The image pickup device can also be used to bring the sheets to right conditions.

Reference is next made to FIGS. 5 and 6. By using the sheet C in FIG. 6 as the diffusion sheet 7 in FIG. 5, using the sheet B in FIG. 6 as the back side sheet shaped optical element 1b in FIG. 5, and using the sheet A in FIG. 6 as the surface side sheet shaped optical element 1a in FIG. 5, the mechanism can be obtained for automatic packaging system to get the construction of the sheet shaped optical elements shown in FIG. 5 by using the device shown in FIG. 6.

As explained before referring to FIG. 5, in the embodiment shown in FIG. 5, the sheet shaped optical element 1a and the diffusion sheet 7 is rotated through 90°, and then each of the element 1a and sheet 7 is placed on the base film 2. The sheet shaped optical element 1b is also placed on the base film 2 without rotation. Therefore, the above structure of FIG. 6 can be applied to get the package shown in FIG. 5 by using the following procedure. In applying the structure of FIG. 6, the sheets A and C are picked up and are rotated through 90° and then placed on the base film 2. And the sheet B is put on the base film 2 without rotation. Thus, the optical elements package shown in FIG. 5 is obtained by using the structure of FIG. 6.

By using the sheet D in FIG. 6 as the light guide 6, the structure of FIG. 6 can be used to obtain the sheet packaging as a complete product. The complete sheet packaging comprises the surface side sheet shaped optical element 1a (sheet A in FIG. 6), the back side sheet shaped optical element 1b (sheet B in FIG. 6), diffusion sheet 7 (sheet C in FIG. 6), and light guide 6 (sheet D in FIG. 6).

This example has the same effect as the above mentioned example, and further has the effect that brings a certain satisfactory degree of automatization.

EXAMPLE 3

The following is a description of the third example of the present invention.

In this example, the sheet shaped optical elements package that can bring the light system such as shown in FIG. 8 is produced. By using the package, the sheet shaped optical elements assembly as mentioned below can be obtained. Namely, the sheet shaped optical elements assembly can be obtained, as illustrated in FIG. 8. The assembly at least comprises the structure in which the first sheet shaped optical element 1a (surface side), and the second sheet shaped optical element 1b (back side), whose optical direction forms a right angle with the optical direction of the first sheet shaped optical element 1a, are piled in the order. In this example, the sheet shaped optical elements package is produced, which gives the light system shown in FIG. 8. The light system further has the diffusion sheet 7, light guide 6, and reflection sheet 5 in this order.

Figure 7:
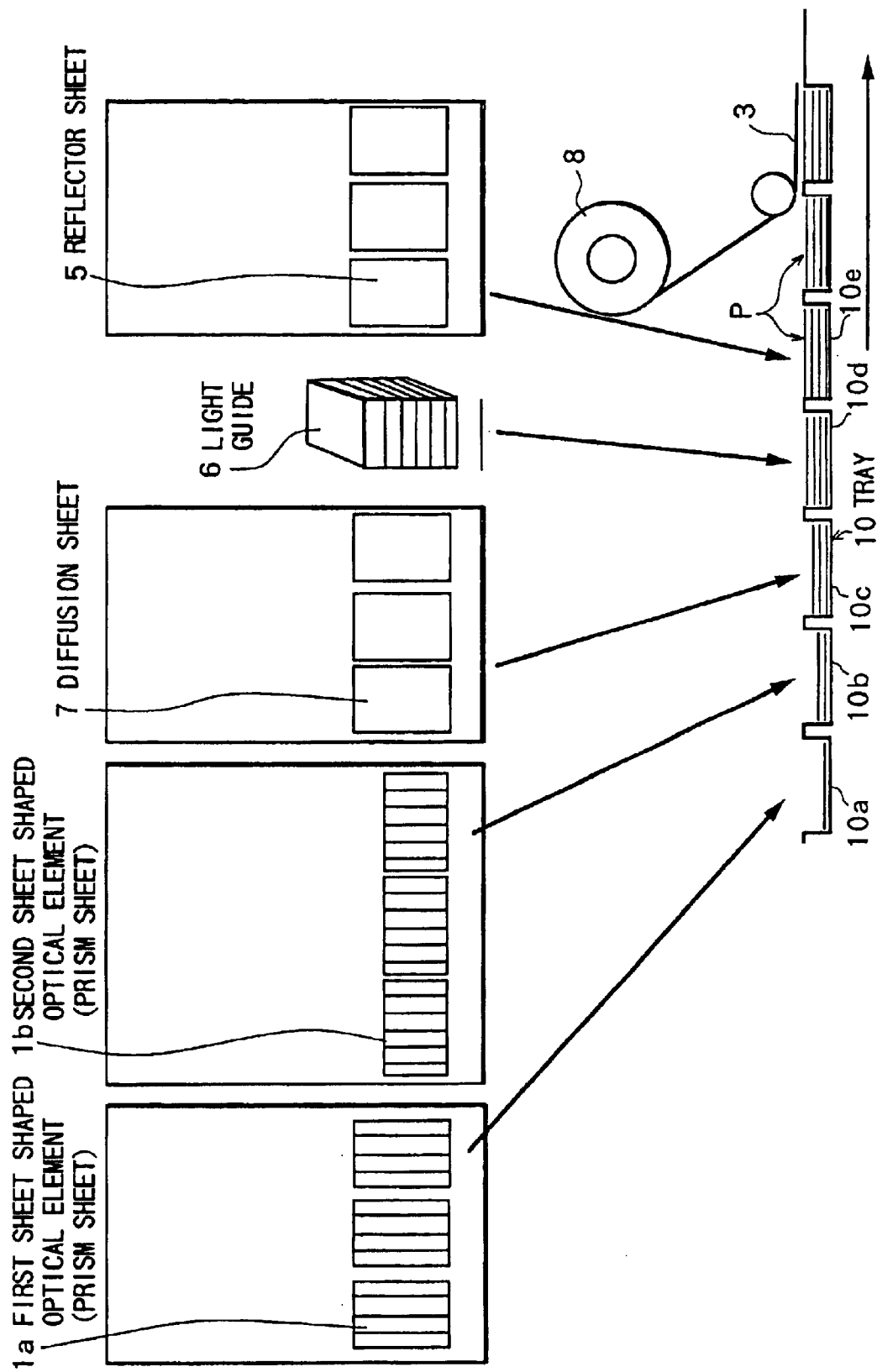
FIG. 7 illustrates a construction of packaging of example 3 of the present invention.

Reference is next made to FIG. 7. In this example, the tray 10 that has plural concave parts as storage parts 10a~10e is used. The sheet shaped optical element 1a, the sheet shaped optical element 1b, whose optical direction forms a right angle with the optical direction of the sheet shaped optical element 1a, and other sheet shaped optical elements (diffusion sheet 7, light guide 6, and reflection sheet 5) are stored in this order in the storage parts 10a~10e. As a result, the sheet shaped optical elements package P is constructed and obtained.

First, the prism sheet as the first sheet shaped optical element 1a (surface side) is placed in the storage part of the tray 10. The storage part 10a is in this state. Then, the prism sheet as the second shaped optical element 1 (backside), whose optical direction forms right angle with the optical direction of the first sheet shaped optical element 1*a*, is placed in the storage part of the tray 10, in which the first sheet shaped optical element 1*a* is placed. Consequently, the structure where the first sheet shaped optical element 1*a* and the second sheet shaped optical element 1*b* are piled is obtained. The storage part shown by the code 10*b* is in this state.

Then, the diffusion sheet 7 is placed in the storage part in which the first sheet shaped optical element 1*a*, 1*b* are put. As a result, the structure where the first sheet shaped optical element 1*a*, second sheet shaped optical element 1, and the diffusion sheet 7 are piled in this order is obtained. The storage part 10*c* is in this state.

Then, the light guide 6 is placed in the storage part with the first and the second sheet shaped optical elements 1*a*, 1*b* and the diffusion sheet 7. As a result, the structure where the first sheet shaped optical element 1*a*, second sheet shaped optical element 1*b*, the diffusion sheet 7 and the light guide 6 are piled in this order is obtained. The storage part 10*d* is in this state.

Then, the reflector sheet 5 is placed in the storage part with the first and the second sheet shaped optical elements 1*a*, 1*b*, the diffusion sheet 7, and the light guide 6. As a result, the structure where the first sheet shaped optical element 1*a*, second sheet shaped optical element 1*b*, the diffusion sheet 7, light guide 6, and the reflector sheet 5 are piled in this order is obtained. The storage part 10*e* is in this state. At this time, the construction of the sheet shaped optical elements package P is completed. Finally, the obtained assembly is sealed with the cover film 3 and is stocked or delivered as a complete product. A roller 8 is provided for supplying the cover film 3.

As a matter of convenience, FIG. 7 shows each state of the production process. That is, as a drawing of the sheet shaped optical elements package P, the state 10*a* where the first sheet shaped optical elements 1*a* is stored in the storage part, the state 10*b* where the second sheet shaped optical element 1*b* is piled, the state 10*c* where the diffusion sheet 7 is further piled, the state 10*d* where the light guide 6 is further piled, and the state 10*e* where the reflection sheet 5 is further piled are shown, respectively. The complete product has, of course, elements 1*a*, 1*b*, 7, 6, 5. The complete product comprises the elements 1*a*, 1*b*, 7, 6, 5 piled, and is arranged in each of the storage parts 10*a*~10*e*.

To produce the sheet shaped optical elements package P, the same process as explained in the Example 2 can be accepted. Namely, in the process, the first sheet shaped optical element 1*a* is picked up and is rotated, and is placed, then the second sheet shaped optical element 1*b* is picked up, and is placed without rotation, and then the diffusion sheet 7 is placed with rotation.

In this example, the sheet shaped optical elements with the prism explained by referring FIG. 14 can be employed as the first and the second sheet shaped optical elements 1*a*, 1*b*, similarly as in the example 2.

The above mentioned sheet shaped optical elements package P can be produced by the automatic assembly system shown in FIG. 6. When the system shown in FIG. 6 is employed, instead of the base film 2 in FIG. 6, the tray 10 that has plural concave parts as storage parts 10*a*~10*e* is used. The tray is used in a belt state similarly as the base film 2 in FIG. 6, and each sheet is placed in the storage parts in the order.

Further, the structure shown in FIG. 6 can have the part on which the sheet E can be put. Thus, the sheet E as the reflector sheet 5, the sheet C as the diffusion sheet 7, the sheet B as the second sheet shaped optical element 1*b*, and the sheet A as the first sheet shaped optical element 1*a* are put and piled in the storage part, and then the sheet shaped optical elements package P shown in FIG. 7 can be obtained.

This example has the same effects as the above mentioned examples, and further, has the effect that brings satisfactory degree of automatization.

EXAMPLE 4

In this example, by using the system shown in FIG. 6, the construction comprising the structure where the first sheet shaped optical element 1*a*, second sheet shaped optical element 1*b*, the diffusion sheet 7, light guide 6, and the reflector sheet 5 are piled on the base film 2 as shown in FIG. 7 is directly obtained.

In this example, instead of tray 10 shown in FIG. 7, base film 2 is used. By the system, the structure where the first sheet shaped optical element 1*a*, second sheet shaped optical element 1*b*, the diffusion sheet 7, light guide 6, and the reflection sheet 5 are piled on the base film 2 can be directly obtained. The construction comprising such structure is stocked or delivered.

In this example, the base film 2 shown in FIG. 6 is conveyed, and on the base film 2, each element (i.e., the reflector sheet 5, the light guide 6, the diffusion sheet 7, the second sheet shaped optical elements 1*b*, and the first sheet shaped optical element 1*a*) are piled in this order. Thus, the package can be obtained. First, the reflector sheet 5 is placed on the base film 2. Then the light guide 6 is placed and piled on the reflector sheet 5. Then the diffusion sheet 7 is placed and piled on the light guide 6. Then the second sheet shaped optical element 1*b* is placed and piled on the diffusion sheet 7. Then the first sheet shaped optical element 1*a* is placed and piled on the second sheet shaped optical element 1*b*. Thus, the package is completed and the product is obtained.

Figure 11:
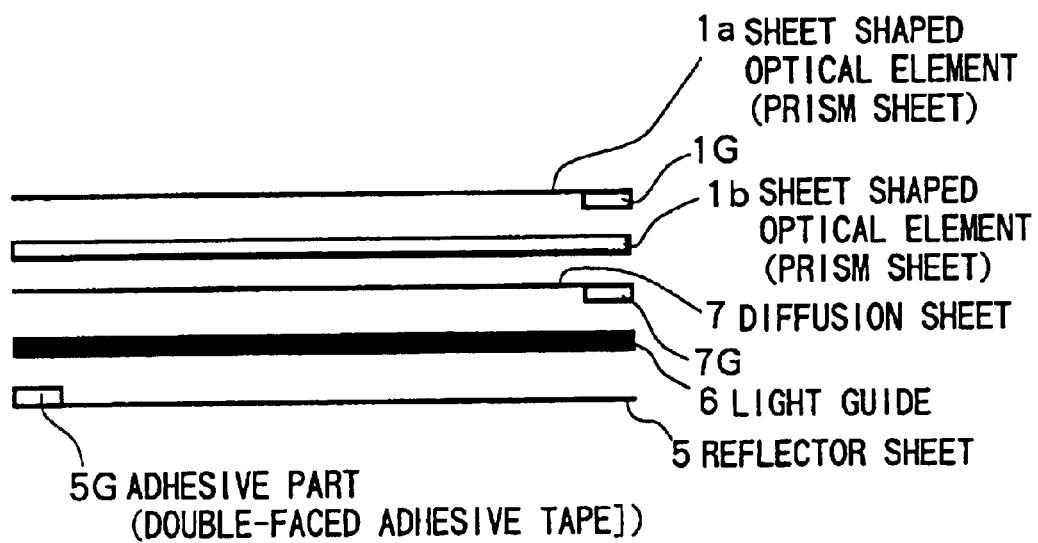
FIG. 11 is a sectional view of a sheet shaped optical element package of example 4 of the present invention.

In this example, different from the tray 10 shown in FIG. 7, on base film 2, there is no part corresponding to the concave storage part. Therefore, displacement may occur at the time when each of the elements is piled. As a result, in this example, as shown in FIG. 11, adhesive parts that connect elements to each other are provided. The embodiment shown in FIG. 11 has an adhesive part 5G on the surface (upper side of the drawing) of the reflector sheet 5. By using the adhesive part 5G, the positions of the reflector sheet 5 and the upper light guide 6 are fixed to each other. Consequently, the reflector sheet 5 and the light guide 6 are arranged without displacement. Also, adhesive part 7G is provided on the surface (lower side of the drawing) of the diffusion sheet 7. By using the adhesive part 7G, the positions of the diffusion sheet 7 and the lower light guide 6 are fixed to each other. Consequently, the diffusion sheet 7 and the lower light guide 6 are arranged without displacement. Also, adhesive part 1G is provided on the surface (lower side of the drawing) of the sheet shaped optical element 1*a*. By using the adhesive part 1G, the positions of the sheet shaped optical element 1*a* and the lower sheet shaped optical element 1*b* are fixed to each other. Consequently, the sheet shaped optical element 1*a* and the sheet shaped optical element 1*b* are arranged without displacement.

Although, in the structure shown in FIG. 11, each adhesive part 1G, 5G, 7G is formed on each edge part (on one side), the adhesive parts may be less than that shown in the drawing. They may be formed on all circumference, may be formed in manner of a horseshoe, or may be formed on opposite two sides. As a material to form the adhesive parts, double sided adhesive tape is used conveniently in this example.

In the embodiment shown in FIG. 11, adhesive parts 1G, 5G, 7G are formed alternately. Thus, when one adhesive part is made per two elements, all elements can be fixed by using the adhesive part(s).

In this example, at the time when the reflector sheet 5 is placed on the base film 2 in the first step, the surface on which the reflector sheet 5 is placed is given slight adhesion properties. As a result, the displacement of the reflector sheet 5 on the base film 2 may not occur.

Figure 12:
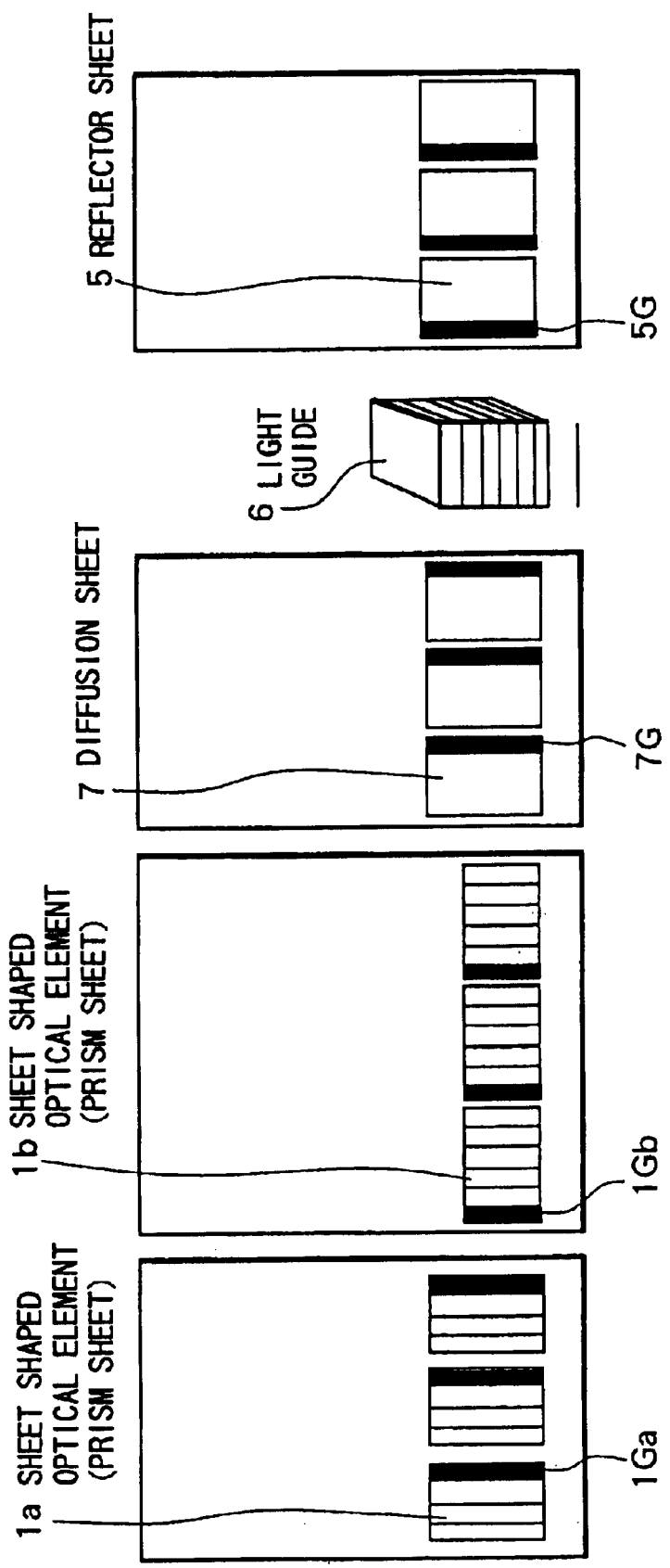
FIG. 12 illustrates a construction of packaging of the sheet shaped optical elements in example 4 of the present invention.

FIG. 12 is the corresponding drawing to FIG. 7 used in the explanation of Example 3. The position of all of the elements with respect to the base film 2 when the elements are conveyed are the same as shown in FIG. 7. The sheet shaped optical element 1a, the diffusion sheet 7, and reflector sheet 5 are rotated through 90° and are placed, and the sheet shaped optical element 1b is placed on without rotation. On the contrary, the manner in which the sheet shaped optical elements 1a, the diffusion sheet 7 and reflector sheet 5 are placed without rotation, and the sheet shaped optical element 1b is placed on after rotation through 90°, can be accepted.

Figure 13:
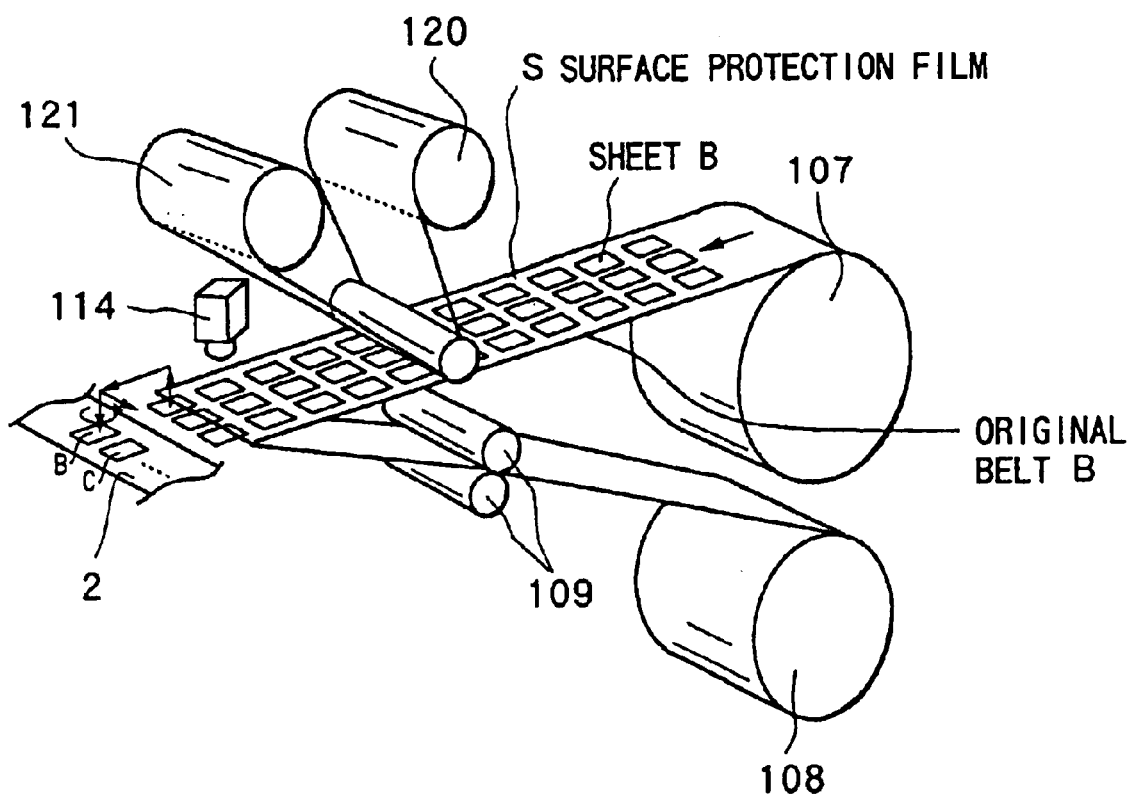
FIG. 13 is a fragmentary view of a device for manufacturing a sheet shaped optical element package of example 4 of the present invention.

In this example, each element of the sheet shaped optical element 1a, the sheet shaped optical element 1b, the diffusion sheet 7, and reflector sheet 5 are covered with and protected by the surface protection sheet S. The surface protection sheet S has slight adhesion properties. Refer to FIG. 13. As shown in the drawing, sheet B (corresponding to the sheet shaped optical element 1b), for example, is put on the original belt B, and, further, is protected by the surface protection sheet S, and is then delivered to the base film 2. Near the base film 2, the surface protection sheet S is stripped. As shown by the code 121, film for stripping is supplied to the original belt B. The film for stripping adheres and catches the surface protection sheet S that is slightly adhered to the original belt B, and thus, the surface protection sheet S is stripped. As shown by reference number 120, the surface protection sheet S is rolled up together with the film for stripping. After the process mentioned above, the sheet B, uncovered from the surface protection sheet S, can be put on the base film 2. The reference numbers in FIG. 13 correspond to those of FIG. 6. The surface protection sheet S can also be used in delivering the elements described in Examples 2 and 3.

In this example, as the element of the sheet shaped optical elements 1a, 1b, the sheet shaped optical element explained referring FIG. 14 can be used.

According to this example, the package that has the structure where the first sheet shaped optical element 1a, the second sheet shaped optical element 1b, the diffusion sheet 7, the light guide 6, and the reflector sheet 5 are piled on the base film 2 directly, is conveniently obtained.

Effects of the Invention

As described above in detail, according to the present invention, a sheet shaped optical element package, a method of use of sheet shaped optical elements, a method of manufacturing a sheet shaped optical element package, and a device for manufacturing a sheet shaped optical element package, which overcome the aforementioned difficulties and drawbacks of the prior art can be provided. Namely, the present invention provides sheet shaped optical elements which are convenient to deliver and supply, easy to treat and pick up, easy to process and manufacture, and can be used in automatic lines, and which are advantageous with regard to the amount of required space.

I claim:

1. A sheet shaped optical element package comprising:
    a base film, plural sheet shaped optical elements carried on said base film, and a cover film formed on said plural sheet shaped optical elements;
    wherein:
    said plural sheet shaped optical elements are arranged on said base film in a row;
    each of said sheet shaped optical elements has an optical direction; and
    upper surfaces of said plural sheet shaped optical elements are covered by said cover film in a manner such that said cover film covers said sheet shaped optical elements such that said cover film has a blank part.

2. A sheet shaped optical element package according to claim 1, wherein:
    each of said sheet shaped optical elements includes a sheet shaped substrate and plural prisms, each of said prism having a sectional view which is a triangle;
    for each of said sheet shaped optical elements, the ridge corresponding to an apex of the triangle of each prism faces away from said sheet shaped substrate, the prisms are combined with the sheet shaped substrate as one body, and the ridges of the prisms run parallel with each other;
    each sheet shaped optical element is supported by being carried by the base film; and
    the surface of each sheet shaped optical element on which said plural prisms are formed is positioned on the opposite side of the respective sheet shaped substrate relative to said base film.

3. A sheet shaped optical element package comprising:
    a base film, and plural sheet shaped optical elements carried on said base film;
    wherein:
    said plural sheet shaped optical elements are arranged on said base film in a row;
    each of said sheet shaped optical elements includes a sheet shaped substrate and plural prisms, each of said prisms having a sectional view which is a triangle;
    for each of said sheet shaped optical elements, the ridge corresponding to an apex of the triangle of each prism faces away from said sheet shaped substrate, the prisms are combined with the sheet shaped substrate as one body, and the ridges of the prisms run parallel with each other;
    each sheet shaped optical element is supported by being carried by the base film; and
    the surface of each sheet shaped optical element on which said plural prisms are formed is positioned on the opposite side of the respective sheet shaped substrate relative to said base film.

4. A sheet shaped optical element package comprising:
    a base film, plural sheet shaped optical elements carried on said base film, and a cover film formed on said plural sheet shaped optical elements;
    wherein:
    said plural sheet shaped optical elements are arranged on said base film in a row;
    said base film being tape shaped carries said sheet shaped optical elements such that said base film has a blank part;

each of said sheet shaped optical elements has an optical direction;

upper surfaces of said plural sheet shaped optical elements are covered by said cover film in a manner such that said cover film covers said sheet shaped optical elements such that said cover film has a blank part; and said plural sheet shaped optical elements are held between said cover film and said base film.

5. A sheet shaped optical element package according to claim 4, wherein:

each of said sheet shaped optical elements includes a sheet shaped substrate and plural prisms, each of said prisms having a sectional view which is a triangle;

for each of said sheet shaped optical elements, the ridge corresponding to an apex of the triangle of each prism faces away from said sheet shaped substrate, the prisms are combined with the sheet shaped substrate as one body, and the ridges of the prisms run parallel with each other;

each sheet shaped optical element is supported by being carried by said base film; and the surface of each sheet shaped optical element on which said plural prisms are formed is positioned on the opposite side of the respective sheet shaped substrate relative to said base film.

6. A sheet shaped optical element package according to claim 4, wherein:

said base film is equal in size to said cover film; and said plural sheet shaped optical elements are held between said base film and said cover film in a sandwich structure.

7. A sheet shaped optical element package comprising:

a base film, plural sheet shaped optical elements carried on said base film, and a cover film supplied on said plural sheet shaped optical elements; and an upper roller to roll up said cover film and a lower roller to roll up said cover film;

wherein:

said plural sheet shaped optical elements are arranged on said base film in a row;

said sheet shaped optical elements are held between said base film and said cover film; and by rolling up by said upper and lower rollers, said sheet shaped optical elements can be picked out.

8. A sheet shaped optical element package according to claim 7, wherein:

upper surfaces of said plural sheet shaped optical elements in a row are covered by said cover film in a manner such that said cover film covers said sheet shaped optical elements such that said cover film has a blank part; and said plural sheet shaped optical elements are held between said cover film and said base film.

9. A sheet shaped optical element package according to claim 7, wherein:

said base film is equal in size to said cover film; and said plural sheet shaped optical elements are held between said base film and said cover film in a sandwich structure.

10. A sheet shaped optical element package according to claim 7, wherein each of said sheet shaped optical elements has an optical direction.

11. A sheet shaped optical element package according to claim 7, wherein:

each of said sheet shaped optical elements includes a sheet shaped substrate and plural prisms, each of said prisms having a sectional view which is a triangle;

for each of said sheet shaped optical elements, the ridge corresponding to an apex of the triangle of each prism faces away from said sheet shaped substrate, the prisms are combined with the sheet shaped substrate as one body, and the ridges of the prisms run parallel with each other;

each sheet shaped optical element is supported by being carried by the base film; and the surface of each sheet shaped optical element on which said plural prisms are formed is positioned on the opposite side of the respective sheet shaped substrate relative to said base film.

12. A sheet shaped optical element package according to claim 7, wherein:

said structure in which said plural sheet shaped optical elements are arranged on said base film in a row and are held between said base film and said cover film, is rolled up to form a reel shape, or said structure is folded to form a Z shape.

* * * * *

UNITED STATES PATENT AND TRADEMARK OFFICE
CERTIFICATE OF CORRECTION

PATENT NO. : 7,085,061 B2
APPLICATION NO. : 10/693918
DATED : August 1, 2006
INVENTOR(S) : Masanari Watanabe It is certified that error appears in the above-identified patent and that said Letters Patent is hereby corrected as shown below:

On the title page item (57), Line 2, After "elements" delete "on" and insert -- carried on --, therefor Column 5, Line 59, Delete "arc" and insert -- are --, therefor Column 12, Line 22, Delete "sane;" and insert -- same; --, therefor Column 13, Line 3, Delete "clement," and insert -- element, --, therefor Column 20, Line 15, Delete "131a," and insert -- 132a, --, therefor Column 20, Line 39, Delete "131a," and insert -- 132a, --, therefor Column 20, Line 41, After "(edge)" delete "131a," and insert -- 132a, --, therefor Column 20, Line 44, After "(edges)" delete "131a," and insert -- 132a, --, therefor Column 23, Line 1, After "element" delete "1" and insert -- 1b --, therefor.

Column 23, Line 13, After "element" delete "1," and insert -- 1b, --, therefor

Column 23, Line 38, Delete "elements" and insert -- element --, therefor

Column 25, Line 22, Delete "elements" and insert -- element --, therefor

UNITED STATES PATENT AND TRADEMARK OFFICE
CERTIFICATE OF CORRECTION

PATENT NO. : 7,085,061 B2
APPLICATION NO. : 10/693918
DATED : August 1, 2006
INVENTOR(S) : Masanari Watanabe It is certified that error appears in the above-identified patent and that said Letters Patent is hereby corrected as shown below:

Column 26, Line 22 - In Claim 2, delete "prism" and
insert -- prisms --, therefor Signed and Sealed this Twelfth Day of December, 2006

JON W. DUDAS
*Director of the United States Patent and Trademark Office*